US012652205B2

(12) United States Patent　　　(10) Patent No.:　US 12,652,205 B2
Zou et al.　　　　　　　　　　　(45) Date of Patent:　　Jun. 9, 2026

(54) ADAPTIVE PEAK TO AVERAGE POWER RATIO (PAPR) SUPPRESSION APPARATUS AND METHOD, AND COMMUNICATION DEVICE

(71) Applicant: HUAWEI TECHNOLOGIES CO., LTD., Shenzhen (CN)

(72) Inventors: Zhiqiang Zou, Shanghai (CN); Yanan Gao, Shanghai (CN); Yaqi Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 437 days.

(21) Appl. No.: 18/325,955

(22) Filed: May 30, 2023

(65)　　　　Prior Publication Data

US 2023/0308333 A1　　　Sep. 28, 2023

Related U.S. Application Data

(63) Continuation of application No. PCT/CN2020/132856, filed on Nov. 30, 2020.

(51) Int. Cl.
H04L 27/26　　　(2006.01)
(52) U.S. Cl.
CPC ................................ H04L 27/2623 (2013.01)
(58) Field of Classification Search
CPC ............................ H04L 27/2623; H04L 5/001
See application file for complete search history.

(56)　　　　　References Cited

U.S. PATENT DOCUMENTS

| | | | |
|---|---|---|---|
| 9,537,686 B2 * | 1/2017 | Janani ..................... | H03F 3/245 |
| 9,819,526 B2 * | 11/2017 | Baligh ............... | H04L 27/2614 |
| 2004/0081324 A1 | 4/2004 | Lau et al. | |
| 2007/0140101 A1 | 6/2007 | Guo et al. | |
| 2007/0178853 A1 * | 8/2007 | Hamada .............. | H04L 27/2623 |
| | | | 455/103 |
| 2008/0101502 A1 * | 5/2008 | Navidpour .......... | H04L 27/2623 |
| | | | 375/296 |
| 2012/0307937 A1 * | 12/2012 | Higuchi ............. | H04L 27/2623 |
| | | | 375/296 |
| 2013/0287145 A1 * | 10/2013 | Park .................... | H04L 27/2614 |
| | | | 375/319 |
| 2015/0222299 A1 * | 8/2015 | Janani ................... | H03F 1/3241 |
| | | | 375/297 |
| 2015/0288547 A1 * | 10/2015 | Janani ...................... | H03F 3/19 |
| | | | 375/297 |

(Continued)

FOREIGN PATENT DOCUMENTS

| | | |
|---|---|---|
| CN | 1553670 A | 12/2004 |
| CN | 111107030 A | 5/2020 |

(Continued)

*Primary Examiner* — Jay P Patel

(57)　　　　　ABSTRACT

PAPR suppression includes a first clipping module and a second clipping module. The second clipping module outputs, to the first clipping module, a to-be-clipped signal that satisfies an input condition of the first clipping module, where the input condition includes a peak distribution feature of an input signal. The first clipping module performs first clipping processing on the to-be-clipped signal to obtain a first clipped signal. PAPR suppression is performed based on collaboration between the two clipping modules.

17 Claims, 6 Drawing Sheets

(56)                    References Cited

U.S. PATENT DOCUMENTS

| | | | | |
|---|---|---|---|---|
| 2016/0191110 A1* | 6/2016 | Brecher | ................. | H04B 17/13 |
| | | | | 375/295 |
| 2017/0134202 A1* | 5/2017 | Baligh | ................ | H04L 27/2614 |
| 2022/0085875 A1* | 3/2022 | Ono | ................... | H04B 7/18515 |

FOREIGN PATENT DOCUMENTS

| | | | | |
|---|---|---|---|---|
| CN | 111107031 A | 5/2020 | | |
| CN | 111464476 A | 7/2020 | | |
| WO | WO-2014141335 A1 * | 9/2014 | ......... | H04L 27/2624 |

* cited by examiner

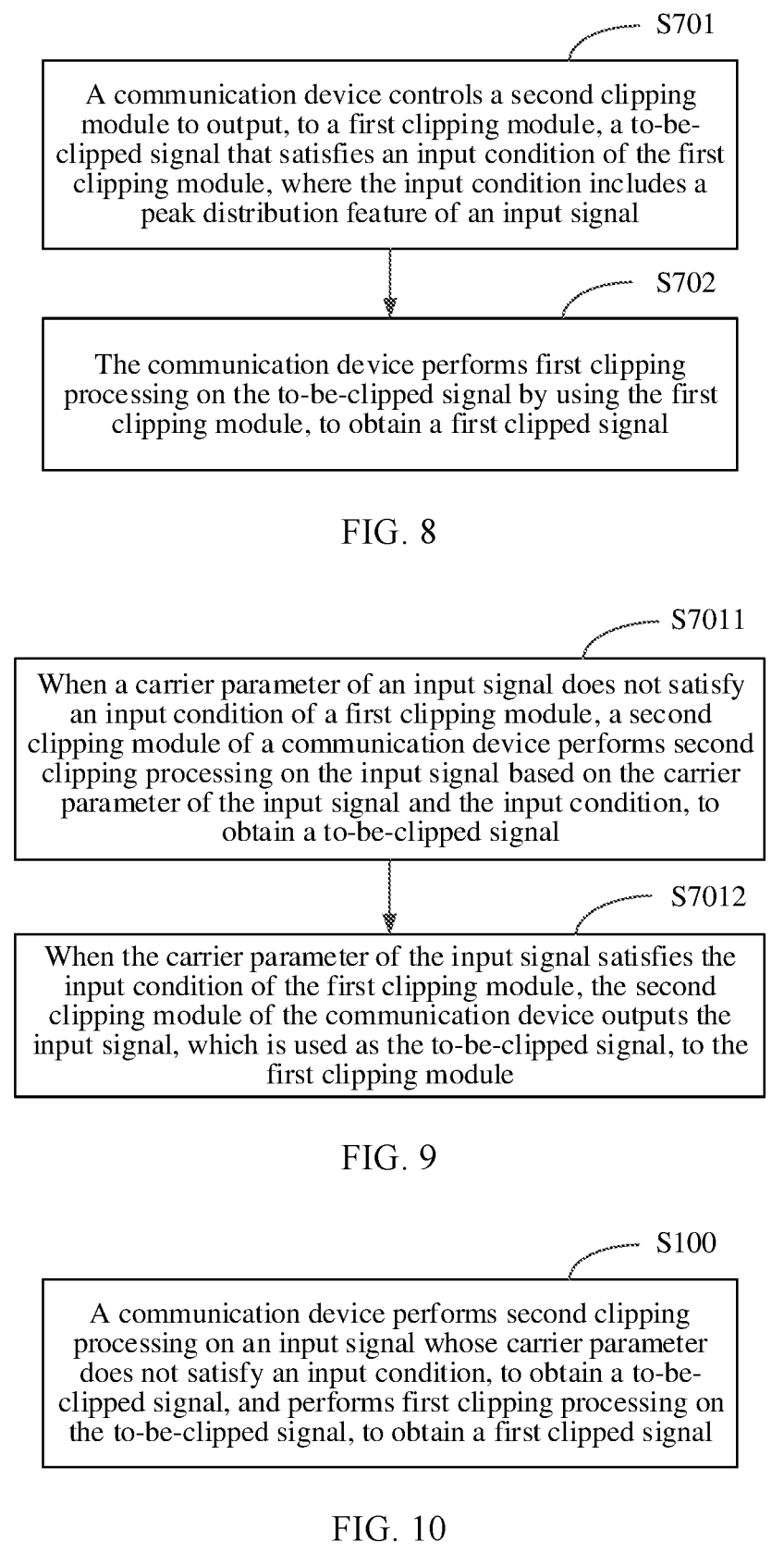

— S701

A communication device controls a second clipping module to output, to a first clipping module, a to-be-clipped signal that satisfies an input condition of the first clipping module, where the input condition includes a peak distribution feature of an input signal

— S702

The communication device performs first clipping processing on the to-be-clipped signal by using the first clipping module, to obtain a first clipped signal

When a carrier parameter of an input signal does not satisfy an input condition of a first clipping module, a second clipping module of a communication device performs second clipping processing on the input signal based on the carrier parameter of the input signal and the input condition, to obtain a to-be-clipped signal

— S7012

When the carrier parameter of the input signal satisfies the input condition of the first clipping module, the second clipping module of the communication device outputs the input signal, which is used as the to-be-clipped signal, to the first clipping module

A communication device performs second clipping processing on an input signal whose carrier parameter does not satisfy an input condition, to obtain a to-be-clipped signal, and performs first clipping processing on the to-be-clipped signal, to obtain a first clipped signal

FIG. 10

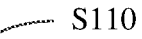

S110

A communication device performs second clipping processing on an input signal whose carrier parameter does not satisfy an input condition, to obtain a to-be-clipped signal, and performs first clipping processing on the to-be-clipped signal, to obtain a first clipped signal

S111

The communication device performs first clipping processing on an input signal whose carrier parameter satisfies the input condition, to obtain the first clipped signal

FIG. 11

S120

A communication device configures, based on a first inter-carrier statistical feature, a clipping parameter corresponding to the first inter-carrier statistical feature

S121

When a carrier parameter of an input signal does not satisfy the first inter-carrier statistical feature, the communication device performs second clipping processing on the input signal based on the carrier parameter of the input signal and the first inter-carrier statistical feature, to obtain a to-be-clipped signal, where a carrier parameter of the to-be-clipped signal satisfies the first inter-carrier statistical feature

S122

The communication device performs first clipping processing on the to-be-clipped signal based on the clipping parameter corresponding to the first inter-carrier statistical feature, to obtain a first clipped signal

FIG. 12

S130

A communication device periodically obtains a new second inter-carrier statistical feature, and configures, based on the new second inter-carrier statistical feature, a clipping parameter corresponding to the new second inter-carrier statistical feature

S131

When a carrier parameter of an input signal does not satisfy the second inter-carrier statistical feature, the communication device performs second clipping processing on the input signal based on the carrier parameter of the input signal and the second inter-carrier statistical feature, to obtain a to-be-clipped signal, where a carrier parameter of the to-be-clipped signal satisfies the second inter-carrier statistical feature

S132

The communication device performs first clipping processing on the to-be-clipped signal based on the clipping parameter corresponding to the second inter-carrier statistical feature, to obtain a first clipped signal

FIG. 13

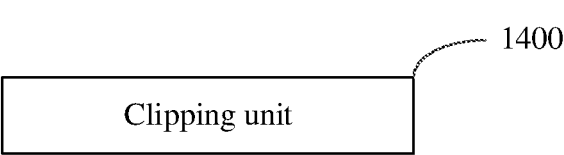

1400

Clipping unit

FIG. 14

ADAPTIVE PEAK TO AVERAGE POWER RATIO (PAPR) SUPPRESSION APPARATUS AND METHOD, AND COMMUNICATION DEVICE

CROSS-REFERENCE TO RELATED APPLICATIONS

This application is a continuation of International Application No. PCT/CN2020/132856 filed on Nov. 30, 2020, the disclosure of which is hereby incorporated by reference in its entirety.

TECHNICAL FIELD

This disclosure relates to the field of communication technologies, and in particular, to an adaptive peak to average power ratio (PAPR) suppression apparatus, method, and communication device.

BACKGROUND

OFDM (Orthogonal Frequency Division Multiplexing) is a multi-carrier modulation technology, and a plurality of carriers are orthogonal to each other. Because an OFDM symbol is obtained by superposing a plurality of independently modulated subcarrier signals, when phases of the subcarriers are the same or similar, the superposed signals generate a large instantaneous power peak, resulting in a high peak to average power ratio (PAPR), which may also be referred to as a peak to average ratio.

If a high PAPR signal is directly sent to a power amplifier, nonlinear distortion of the power amplifier is caused, and a new frequency component is generated. As a result, a demodulation result is affected, and the power amplifier is even burnt in a severe case. In a related technology, a clipping algorithm is designed on an intermediate frequency side of a transmitter to reduce a PAPR, protect a power amplifier, and improve power amplifier efficiency.

SUMMARY

In view of the foregoing deficiencies, an adaptive peak to average power ratio (PAPR) suppression apparatus, method and communication device are provided. PAPR suppression is performed based on collaboration between two clipping modules, so that an implementation is simple and is applicable to a plurality of scenarios, and it is ensured that no clipping is missed, a PAPR is controllable, and a power amplifier is protected.

According to a first aspect, an embodiment provides an adaptive peak to average power ratio PAPR suppression apparatus. The apparatus includes a first clipping module and a second clipping module. The second clipping module outputs, to the first clipping module, a to-be-clipped signal that satisfies an input condition of the first clipping module, where the input condition includes a peak distribution feature of an input signal. The first clipping module performs first clipping processing on the to-be-clipped signal, to obtain a first clipped signal.

Based on the PAPR suppression apparatus in this implementation, PAPR suppression is performed based on collaboration between the two clipping modules. In comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature in this application is simpler. This resolves a technical problem that a static clipping algorithm is excessively complex or an application scenario is limited in the related technology.

According to a first possible implementation of the first aspect, the second clipping module is configured to obtain an input signal, and when a carrier parameter of the input signal does not satisfy the input condition of the first clipping module, perform second clipping processing on the input signal based on the carrier parameter of the input signal and the input condition, to obtain the to-be-clipped signal.

According to the first aspect or the first possible implementation of the first aspect, in a second possible implementation, the second clipping module is configured to obtain the input signal, and when the carrier parameter of the input signal satisfies the input condition of the first clipping module, output the input signal, which is used as the to-be-clipped signal, to the first clipping module.

Based on the PAPR suppression apparatus in the foregoing implementation of this application, different clipping processes are used for the input signal based on collaboration between the two clipping modules, to implement an adaptive clipping process. This implementation is simple and is applicable to more application scenarios.

According to the first aspect, in a third possible implementation, in a bypass mode, the second clipping module is further configured to obtain an input signal, and output the input signal to the first clipping module.

The first clipping module is configured to perform third clipping processing on the input signal based on a clipping parameter corresponding to a carrier parameter of the input signal. The clipping parameter is configured for different carriers based on a statistical feature of peak distribution of the input signal.

According to the third possible implementation of the first aspect, in a fourth possible implementation, the carrier parameter is an inter-carrier power ratio, and the clipping parameter is a weighting coefficient of clipping noise.

Based on the PAPR suppression apparatus in the foregoing implementation of this application, adaptive weighted allocation on the clipping noise by the first clipping module is implemented in a manner of configuring different clipping parameters for different carrier configurations based on the statistical feature of the peak distribution of the input signal. In comparison with the simple configuration of the clipping parameter in the related technology (the typical scenario), the foregoing implementation of this application is applicable to a plurality of scenarios. It is ensured that no clipping is missed, the PAPR is controllable, and the power amplifier is protected. In comparison with the manner in which each peak value needs to be extracted for clipping processing in the strict scenario, this manner of pre-configuring the clipping parameter based on the statistical feature in this application is simpler.

According to the first possible implementation of the first aspect, in a fifth possible implementation, the input condition of the first clipping module is a static first inter-carrier statistical feature.

The second clipping module is configured to: when the carrier parameter of the input signal does not satisfy the first inter-carrier statistical feature, perform second clipping processing on the input signal based on the carrier parameter of the input signal and the first inter-carrier statistical feature, to obtain the to-be-clipped signal.

The first clipping module is configured to perform first clipping processing on the to-be-clipped signal based on a clipping parameter corresponding to the first inter-carrier statistical feature, to obtain the first clipped signal.

Based on the PAPR suppression apparatus in the foregoing implementation of this application, according to a process in which the second clipping module adaptively enables clipping processing based on a relationship between the input signal and the first inter-carrier statistical feature and performs clipping processing on the input signal, PAPR control of a signal in any scenario is applicable, and an implementation is simple.

According to the first possible implementation of the first aspect, in a sixth possible implementation, the input condition of the first clipping module is a dynamic second inter-carrier statistical feature, and the first clipping module is configured to periodically update the second carrier statistical feature and a clipping parameter corresponding to the second carrier statistical feature.

The second clipping module is configured to: when the carrier parameter of the input signal does not satisfy the second inter-carrier statistical feature, perform second clipping processing on the input signal based on the carrier parameter of the input signal and the second inter-carrier statistical feature, to obtain the to-be-clipped signal.

The first clipping module is configured to perform first clipping processing on the to-be-clipped signal based on the clipping parameter corresponding to the second inter-carrier statistical feature, to obtain the first clipped signal.

Based on the PAPR suppression apparatus in the foregoing implementation of this application, according to a process in which the second clipping module adaptively enables clipping processing based on a relationship between the input signal and the second inter-carrier statistical feature and performs clipping processing on the input signal, the first clipping module periodically collects statistics of an inter-carrier feature of the input signal, and updates, based on the inter-carrier feature obtained through statistics collection, the second inter-carrier statistical feature and the corresponding clipping parameter that are locally configured, so that adaptive clipping processing can also be implemented. Based on collaboration between the two modules that can perform adaptive clipping processing, PAPR control of a signal in any scenario is applicable, and an implementation is simple.

According to the fifth or the sixth possible implementation of the first aspect, in a seventh possible implementation, the carrier parameter of the input signal, the first inter-carrier statistical feature, and the second carrier statistical feature each include an inter-carrier power ratio.

According to a second aspect, an embodiment provides a communication device, including the adaptive peak to average power ratio PAPR suppression apparatus in any implementation of the first aspect.

According to a third aspect, an embodiment provides a communication system. The communication system includes a baseband unit BBU, and the communication system further includes a radio remote unit RRU or an active antenna unit AAU. The first clipping module in any implementation of the first aspect is in the RRU or the AAU, and the second clipping module in any implementation of the first aspect is in the BBU. Alternatively, both the first clipping module and the second clipping module in any implementation of the first aspect are in the RRU or the AAU.

According to a fourth aspect, an embodiment provides an adaptive peak to average power ratio PAPR suppression method, where the method is applied to a communication device. The method includes the following steps.

The communication device performs second clipping processing on an input signal whose carrier parameter does not satisfy an input condition, to obtain a to-be-clipped signal, and performs first clipping processing on the to-be-clipped signal, to obtain a first clipped signal. The input condition includes a peak distribution feature of an input signal, and a carrier parameter of the to-be-clipped signal satisfies the input condition.

According to the PAPR suppression method in this application, preprocessing (second clipping processing) is performed on the input signal that does not satisfy the peak distribution feature, to obtain the to-be-clipped signal that satisfies the peak distribution feature, and then first clipping processing is performed on the to-be-clipped signal, to obtain the first clipped signal. In a manner of step-by-step processing and two-level clipping, in comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature and preprocessing the input signal in this application is simpler. This resolves a technical problem that a static clipping algorithm is excessively complex or an application scenario is limited in the related technology.

In a first possible implementation of the fourth aspect, that the communication device performs second clipping processing on an input signal whose carrier parameter does not satisfy an input condition, to obtain a to-be-clipped signal includes:

The communication device performs second clipping processing on the input signal based on the carrier parameter of the input signal and the input condition when the carrier parameter of the input signal does not satisfy the input condition, to obtain the to-be-clipped signal.

According to the fourth aspect or the first possible implementation of the fourth aspect, in a second possible implementation, the method further includes: The communication device performs first clipping processing on an input signal whose carrier parameter satisfies the input condition, to obtain the first clipped signal.

According to the PAPR suppression method in the foregoing implementation of this disclosure, different clipping processes are used for the input signal based on a relationship between the carrier parameter of the input signal and the input condition. In comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature and preprocessing the input signal in this application is simpler. This resolves a technical problem that a static clipping algorithm is excessively complex or an application scenario is limited in the related technology.

In a third possible implementation of the fourth aspect, the method further includes:

The communication device performs third clipping processing on the input signal based on a clipping parameter corresponding to the carrier parameter of the input signal. The clipping parameter is configured for different carriers based on a statistical feature of peak distribution of the input signal.

According to the third possible implementation of the fourth aspect, in a fourth possible implementation, the carrier parameter is an inter-carrier power ratio, and the clipping parameter is a weighting coefficient of clipping noise.

According to the PAPR suppression method in the foregoing implementation of this disclosure, adaptive weighted allocation on the clipping noise is implemented by the communication device in a manner of configuring different clipping parameters for different carrier configurations based on the statistical feature of the peak distribution of the input signal. In comparison with the simple configuration of the clipping parameter in the related technology (the typical scenario), the foregoing implementation of this application is applicable to a plurality of scenarios. It is ensured that no clipping is missed, the PAPR is controllable, and the power amplifier is protected. In comparison with the manner in which each peak value needs to be extracted for clipping processing in the strict scenario, this manner of pre-configuring the clipping parameter based on the statistical feature in this application is simpler.

According to the first possible implementation of the fourth aspect, in a fifth possible implementation, the input condition is a static first inter-carrier statistical feature.

That the communication device performs second clipping processing on the input signal based on the carrier parameter of the input signal and the input condition when the carrier parameter of the input signal does not satisfy the input condition, to obtain the to-be-clipped signal includes:

When the carrier parameter of the input signal does not satisfy the first inter-carrier statistical feature, the communication device performs second clipping processing on the input signal based on the carrier parameter of the input signal and the first inter-carrier statistical feature, to obtain the to-be-clipped signal.

That the communication device performs first clipping processing on the to-be-clipped signal, to obtain a first clipped signal includes:

The communication device performs first clipping processing on the to-be-clipped signal based on a clipping parameter corresponding to the first inter-carrier statistical feature, to obtain the first clipped signal.

According to the fifth possible implementation of the fourth aspect, in a sixth possible implementation, the method further includes:

The communication device configures, based on the first inter-carrier statistical feature, the clipping parameter corresponding to the first inter-carrier statistical feature.

According to the PAPR suppression method in the foregoing implementation of this application, according to a process in which clipping processing is adaptively enabled based on a relationship between the input signal and the first inter-carrier statistical feature and clipping processing is performed on the input signal, PAPR control of a signal in any scenario is applicable, and an implementation is simple.

According to the first possible implementation of the fourth aspect, in a seventh possible implementation, the input condition is a dynamic second carrier statistical feature. The method further includes:

The communication device periodically obtains a new second carrier statistical feature, and configures, based on the new second carrier statistical feature, a clipping parameter corresponding to the new second carrier statistical feature.

According to the seventh possible implementation of the fourth aspect, in an eighth possible implementation, that the communication device performs second clipping processing on the input signal based on the carrier parameter of the input signal and the input condition when the carrier parameter of the input signal does not satisfy the input condition, to obtain the to-be-clipped signal includes:

When the carrier parameter of the input signal does not satisfy the second inter-carrier statistical feature, the communication device performs second clipping processing on the input signal based on the carrier parameter of the input signal and the second inter-carrier statistical feature, to obtain the to-be-clipped signal.

That the communication device performs first clipping processing on the to-be-clipped signal, to obtain a first clipped signal includes:

The communication device performs first clipping processing on the to-be-clipped signal based on a clipping parameter corresponding to the second inter-carrier statistical feature, to obtain the first clipped signal.

According to the PAPR suppression method in the foregoing implementation of this application, according to a process in which second clipping processing is adaptively enabled based on a relationship between the input signal and the second inter-carrier statistical feature and second clipping processing is performed on the input signal, statistics of an inter-carrier feature of the input signal is periodically collected, and the second inter-carrier statistical feature and the corresponding clipping parameter that are locally configured are updated based on the inter-carrier feature obtained through statistics collection, so that adaptive first clipping processing can also be implemented. Based on collaboration between the two processes in which adaptive clipping processing can be performed, PAPR control of a signal in any scenario is applicable, and an implementation is simple.

According to any one of the fifth to the eighth possible implementations of the fourth aspect, in a ninth possible implementation, the carrier parameter of the input signal, the first inter-carrier statistical feature, and the second carrier statistical feature each are an inter-carrier power ratio.

According to a fifth aspect, an embodiment of this application provides an adaptive peak to average power ratio PAPR suppression apparatus. The apparatus is used in a communication device, and the apparatus includes:

a clipping unit, configured to perform second clipping processing on an input signal whose carrier parameter does not satisfy an input condition, to obtain a to-be-clipped signal, and perform first clipping processing on the to-be-clipped signal, to obtain a first clipped signal, where the input condition includes a peak distribution feature of an input signal, and a carrier parameter of the to-be-clipped signal satisfies the input condition.

The PAPR suppression apparatus in this application performs preprocessing (second clipping processing) on the input signal that does not satisfy the peak distribution feature, to obtain the to-be-clipped signal that satisfies the peak distribution feature, and then performs first clipping processing on the to-be-clipped signal, to obtain the first clipped signal. In a manner of step-by-step processing and two-level clipping, in comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature and preprocessing the input signal in this application is simpler. This resolves a technical problem that a static clipping algorithm is excessively complex or an application scenario is limited in the related technology.

In a first possible implementation of the fifth aspect, the clipping unit includes:

a second clipping module, configured to: perform second clipping processing on the input signal based on the carrier parameter of the input signal and the input condition when the carrier parameter of the input signal does not satisfy the input condition, to obtain the to-be-clipped signal.

According to the fifth aspect or the first possible implementation of the fifth aspect, in a second possible implementation, the apparatus further includes:

a first clipping module, configured to perform first clipping processing on an input signal whose carrier parameter satisfies the input condition, to obtain the first clipped signal.

Based on the PAPR suppression apparatus in the foregoing implementation of this application, different clipping processes are used for the input signal based on a relationship between the carrier parameter of the input signal and the input condition. In comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature and preprocessing the input signal in this application is simpler. This resolves a technical problem that a static clipping algorithm is excessively complex or an application scenario is limited in the related technology.

In a third possible implementation of the fifth aspect, the apparatus further includes:

a third clipping module, configured to perform third clipping processing on the input signal based on a clipping parameter corresponding to the carrier parameter of the input signal, where the clipping parameter is configured for different carriers based on a statistical feature of peak distribution of the input signal.

According to the third possible implementation of the fifth aspect, in a fourth possible implementation, the carrier parameter is an inter-carrier power ratio, and the clipping parameter is a weighting coefficient of clipping noise.

Based on the PAPR suppression apparatus in the foregoing implementation of this application, adaptive weighted allocation on the clipping noise is implemented by the communication device in a manner of configuring different clipping parameters for different carrier configurations based on the statistical feature of the peak distribution of the input signal. In comparison with the simple configuration of the clipping parameter in the related technology (the typical scenario), the foregoing implementation of this application is applicable to a plurality of scenarios. It is ensured that no clipping is missed, the PAPR is controllable, and the power amplifier is protected. In comparison with the manner in which each peak value needs to be extracted for clipping processing in the strict scenario, this manner of pre-configuring the clipping parameter based on the statistical feature in this application is simpler.

According to the first possible implementation of the fifth aspect, in a fifth possible implementation, the input condition is a static first inter-carrier statistical feature.

The second clipping module is further configured to: when the carrier parameter of the input signal does not satisfy the first inter-carrier statistical feature, perform second clipping processing on the input signal based on the carrier parameter of the input signal and the first inter-carrier statistical feature, to obtain the to-be-clipped signal.

The first clipping module is further configured to perform first clipping processing on the to-be-clipped signal based on a clipping parameter corresponding to the first inter-carrier statistical feature, to obtain the first clipped signal.

According to the fifth possible implementation of the fifth aspect, in a sixth possible implementation, the apparatus further includes:

a first configuration module, configured to configure, based on the first inter-carrier statistical feature, the clipping parameter corresponding to the first inter-carrier statistical feature.

Based on the PAPR suppression apparatus in the foregoing implementation of this disclosure, according to a process in which clipping processing is adaptively enabled based on a relationship between the input signal and the first inter-carrier statistical feature and clipping processing is performed on the input signal, PAPR control of a signal in any scenario is applicable, and an implementation is simple.

According to the first possible implementation of the fifth aspect, in a seventh possible implementation, the input condition is a dynamic second carrier statistical feature. The apparatus further includes:

a second configuration module, configured to periodically obtain a new second carrier statistical feature, and configure, based on the new second carrier statistical feature, a clipping parameter corresponding to the new second carrier statistical feature.

According to the seventh possible implementation of the fifth aspect, in an eighth possible implementation, the second clipping module is further configured to: when the carrier parameter of the input signal does not satisfy the second inter-carrier statistical feature, perform second clipping processing on the input signal based on the carrier parameter of the input signal and the second inter-carrier statistical feature, to obtain the to-be-clipped signal.

The first clipping module is further configured to perform first clipping processing on the to-be-clipped signal based on a clipping parameter corresponding to the second inter-carrier statistical feature, to obtain the first clipped signal.

Based on the PAPR suppression apparatus in the foregoing implementation of this disclosure, according to a process in which second clipping processing is adaptively enabled based on a relationship between the input signal and the second inter-carrier statistical feature and second clipping processing is performed on the input signal, statistics of an inter-carrier feature of the input signal is periodically collected, and the second inter-carrier statistical feature and the corresponding clipping parameter that are locally configured are updated based on the inter-carrier feature obtained through statistics collection, so that adaptive first clipping processing can also be implemented. Based on collaboration between the two processes in which adaptive clipping processing can be performed, PAPR control of a signal in any scenario is applicable, and an implementation is simple.

According to any one of the fifth to the eighth possible implementations of the fifth aspect, in a ninth possible implementation, the carrier parameter of the input signal, the first inter-carrier statistical feature, and the second carrier statistical feature each are an inter-carrier power ratio.

According to a sixth aspect, an embodiment provides an adaptive peak to average power ratio PAPR suppression apparatus, including:

a processor; and a memory configured to store executable instructions of the processor, where the processor is configured to implement the method in any one of the fourth aspect or the implementations of the fourth aspect when executing the instructions.

According to a seventh aspect, an embodiment provides a non-volatile computer-readable storage medium, storing computer program instructions. When the computer program instructions are executed by a processor, the method in any one of the fourth aspect or the implementations of the fourth aspect is implemented.

According to an eighth aspect, an embodiment provides a terminal device. The terminal device can perform the PAPR suppression method in one or more of the fourth aspect or the plurality of possible implementations of the fourth aspect.

According to a ninth aspect, an embodiment provides a computer program product, including computer-readable code or a non-volatile computer-readable storage medium carrying computer-readable code. When the computer-readable code is run on an electronic device, a processor in the electronic device performs the PAPR suppression method in one or more of the fourth aspect or the plurality of possible implementations of the fourth aspect.

These aspects and other aspects of this application are more concise and more comprehensive in descriptions of the following (a plurality of) embodiments.

BRIEF DESCRIPTION OF DRAWINGS

The accompanying drawings included in the specification and constructing a part of the specification jointly show the example embodiments, characteristics and aspects of this disclosure, and are intended to explain the principles thereof.

FIG. 8 is a flowchart of a PAPR suppression method according to an embodiment;

FIG. 9 is a flowchart of a PAPR suppression method according to an embodiment;

FIG. 10 is a flowchart of a PAPR suppression method according to an embodiment;

FIG. 11 is a flowchart of a PAPR suppression method according to an embodiment;

FIG. 12 is a flowchart of a PAPR suppression method according to an embodiment;

FIG. 13 is a flowchart of a PAPR suppression method according to an embodiment; and FIG. 14 is a block diagram of a PAPR suppression apparatus according to an embodiment.

DESCRIPTION OF EMBODIMENTS

The following will describe various example embodiments, features and aspects of this disclosure in detail with reference to the accompanying drawings. Identical reference signs in the accompanying drawings indicate elements that have same or similar functions. Although various aspects of embodiments are illustrated in the accompanying drawings, the accompanying drawings are merely illustrative and are not necessarily drawn in proportion unless otherwise specified.

The specific term "example" herein means "used as an example, embodiment or illustration". Any embodiment described as "example" is not necessarily explained as being superior or better than other embodiments.

In addition, to better describe this disclosure, numerous specific details are given in the following specific implementations. A person of ordinary skill in the art should understand that this application may also be implemented without the specific details. In some embodiments, methods, means, components, and circuits well known by a person skilled in the art are not described in detail, so that a main purpose of this application is highlighted.

Definition of Terms

Clipping: Suppressing a peak value that exceeds a threshold that is set for a signal with a large peak value. A peak clipping process is referred to as clipping.

Clipping noise: A difference between an original signal and a clipping threshold.

Carrier parameter: A feature parameter of a carrier of a signal, for example, a modulation scheme of the carrier, a spectrum occupation status, a power spectral density, or inter-carrier instantaneous information, where the inter-carrier instantaneous information may include an inter-carrier power ratio, or the like.

The modulation scheme of the carrier may be different for a phase, an amplitude, and the like of data carried on the carrier. The spectrum occupation status of the carrier may be a width of a spectrum occupied by the carrier, a location of the carrier in a frequency band, or the like. The inter-carrier instantaneous information may be information about a relationship between parameters between carriers at a moment. The inter-carrier power ratio may be a ratio of power configurations between different carriers.

Inter-carrier statistical feature: A result obtained by collecting statistics of a relationship between parameters between carriers of an input signal in a specific time period.

If an intermediate frequency clipping algorithm is designed based on a most strict scenario, implementation overheads are large and complexity is high. If an intermediate frequency clipping algorithm is designed based on a typical scenario, although implementation complexity is reduced, adaptability of the intermediate frequency clipping algorithm is poor, and clipping is missed when a signal peak feature changes, affecting robustness of a power amplifier.

Figure 1A:
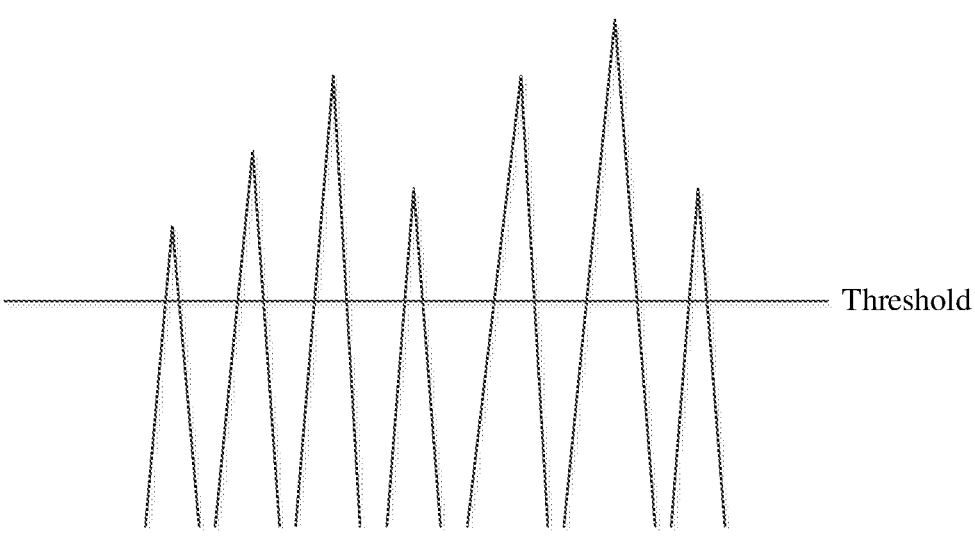
FIG. 1a and FIG. 1B each show an example of a clipping scenario in a related technology.
Figure 1B:
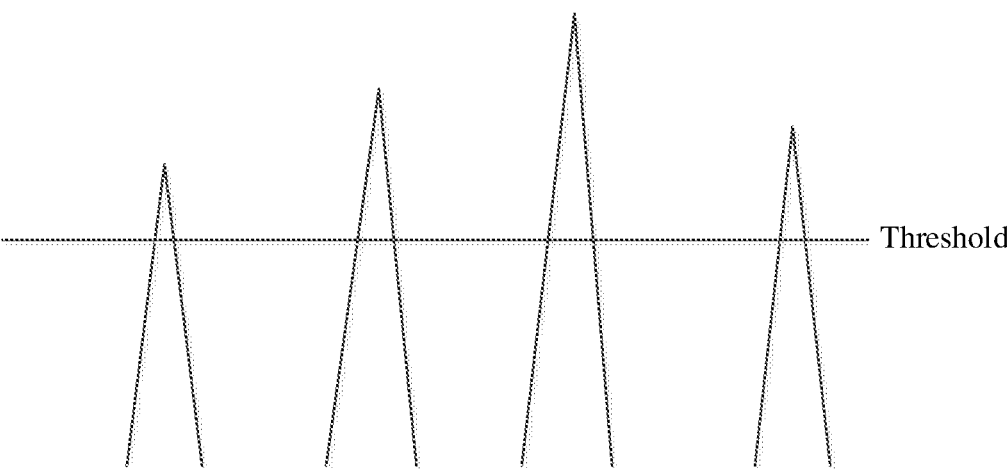

FIG. 1a and FIG. 1B each show an example of a clipping scenario in a related technology. As shown in FIG. 1a, for example, in a strict scenario, a power characteristic of an input signal is enabled, and consequently peak distribution of the input signal becomes very dense. In this case, clipping is performed based on the most strict scenario, and clipping processing needs to be performed on each extracted peak value. As a result, implementation complexity is high, and overheads are large. As shown in FIG. 1B, in a typical scenario, a power characteristic of an input signal is not enabled, a peak distribution feature of the input signal does not change (or changes slightly), and peak distribution of the input signal is sparse. In this case, clipping processing is performed based on a design of the typical scenario. However, a clipping processing method is applicable to a limited scenario, and clipping of a part of peak values may be missed when the clipping processing method is applied to a complex scenario.

Therefore, a technical problem to be resolved in this disclosure is that a static intermediate frequency clipping algorithm in a related technology is excessively complex or an application scenario is limited.

Figure 2:
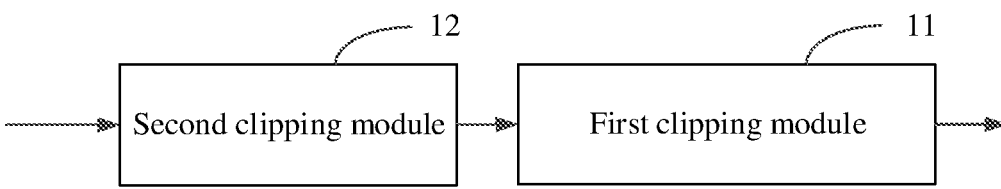
FIG. 2 is a block diagram of a PAPR suppression apparatus according to an embodiment.
Figure 3:
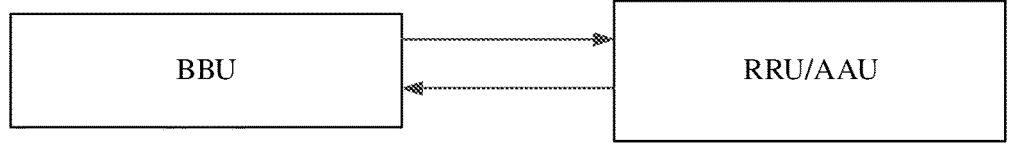
FIG. 3 is a schematic diagram of an application scenario according to an embodiment.

To resolve the foregoing technical problem, an adaptive peak to average power ratio (PAPR) suppression apparatus is provided in this application. FIG. 2 is a block diagram of a PAPR suppression apparatus according to an embodiment of this disclosure. FIG. 3 is a schematic diagram of an application scenario according to an embodiment.

In the application scenario shown in FIG. 3, a communication device may include a BBU (Baseband Unit), an RRU (Radio Remote Unit), and/or an AAU (Active Antenna Unit). With the advent of 3G (Third Generation mobile communication technology), a base station in which a baseband unit and a radio frequency unit are separated emerges. This base station is referred to as a distributed base station. A baseband part is referred to as a BBU, and the radio frequency unit is referred to as an RRU. The RRU may be mounted on a wall of an equipment room, the BBU is installed in a standard cabinet, and the RRU is connected to an antenna through a feeder. Alternatively, the RRU is installed on a tower, the BBU is connected to the RRU through an optical fiber, and the RRU is connected to an antenna through a jumper. Since 4G (Fourth Generation mobile communication technology), a conventional integrated macro base station is completely replaced with a BBU+RRU+antenna mode, and some BBUs are centrally disposed in an equipment room to form a BBU pool. A massive MIMO (multiple-input multiple-output) technology is introduced into 5G (Fifth Generation), and therefore an AAU emerges. Higher-order MIMO needs more antennas, and more antennas lead to more feeders and more feeder interfaces on an RRU. This increases technological complexity. The feeder has a loss, which affects partial system performance. Therefore, in 5G, an RRU and an original passive antenna are integrated, to form a latest AAU.

A PAPR suppression apparatus in an implementation provided in this application may include a first clipping module 11 and a second clipping module 12 shown in FIG. 2. As shown in FIG. 2, an input end of the second clipping module 12 is configured to receive an input signal, an output end of the second clipping module 12 is connected to an input end of the first clipping module 11, and an output end of the first clipping module 11 outputs a clipped signal.

In a possible implementation, an input condition includes a peak distribution feature of an input signal. The peak distribution feature of the input signal may include a statistical feature of peak distribution of the input signal. The peak distribution feature of the input signal is mainly affected by factors such as an inter-carrier power ratio of the input signal, a modulation scheme of a carrier, and a spectrum occupation status. The inter-carrier power ratio may be a ratio of power configurations between different carriers. The modulation scheme of the carrier may be different for a phase, an amplitude, and the like of data carried on the carrier. The spectrum occupation status of the carrier may be a width of a spectrum occupied by the carrier, a location of the carrier in a frequency band, or the like.

In other words, the first clipping module 11 may include a clipping parameter configured based on the statistical feature of the peak distribution of the input signal. When a carrier parameter of the input signal satisfies the input condition, the first clipping module 11 may directly perform first clipping processing on the input signal based on the carrier parameter of the input signal and the clipping parameter. In a possible implementation, the clipping parameter may be data related to an allocation manner of clipping noise, for example, a ratio used for allocating clipping noise when different carriers are clipped, or a weighting coefficient of clipping noise corresponding to different carriers when different carriers are clipped.

For example, it is assumed that the inter-carrier power ratio of the input signal is 1:1. It is configured in the first clipping module 11 that, when the inter-carrier power ratio of the input signal is 1:1, a noise allocation ratio during clipping is also 1:1. When it is determined, based on the carrier parameter of the input signal, that the inter-carrier power ratio of the input signal is 1:1, the first clipping module 11 may perform first clipping processing on the input signal based on the configured clipping parameter (namely, the noise allocation ratio 1:1 during clipping).

The second clipping module 12 may output, to the first clipping module 11, a to-be-clipped signal that satisfies the input condition of the first clipping module 11, and the first clipping module may perform first clipping processing on the to-be-clipped signal, to obtain a first clipped signal.

In a possible implementation, the second clipping module 12 is configured to determine, depending on whether the carrier parameter of the input signal satisfies the input condition of the first clipping module 11, whether to enable second clipping processing on the input signal.

In a possible implementation, the second clipping module 12 is configured to obtain the input signal, and when the carrier parameter of the input signal satisfies the input condition of the first clipping module 11, output the input signal, which is used as the to-be-clipped signal, to the first clipping module 11. For example, when the carrier parameter of the input signal satisfies the input condition of the first clipping module 11, the second clipping module 12 may skip enabling second clipping processing on the input signal, in other words, disable second clipping processing on the input signal. In other words, when the carrier parameter of the input signal satisfies the input condition of the first clipping module 11, the second clipping module 12 may skip performing second clipping processing on the input signal.

In another possible implementation, the second clipping module 12 is configured to obtain an input signal, and when a carrier parameter of the input signal does not satisfy the input condition of the first clipping module 11, perform second clipping processing on the input signal based on the carrier parameter of the input signal and the input condition, to obtain the to-be-clipped signal. For example, when the carrier parameter of the input signal does not satisfy the input condition of the first clipping module 11, the second clipping module 12 may determine to enable second clipping processing on the input signal. Specifically, second clipping processing may be performed on the input signal, and a carrier parameter of the to-be-clipped signal obtained through second clipping processing satisfies the input condition of the first clipping module 11.

In other words, when the carrier parameter of the input signal does not satisfy the input condition of the first clipping module 11, the second clipping module 12 may be configured to perform preprocessing (second clipping processing) on the input signal, where the carrier parameter of the to-be-clipped signal obtained through preprocessing satisfies the input condition of the first clipping module 11, so that the first clipping module 11 may perform first clipping processing on the to-be-clipped signal, to obtain the first clipped signal.

In a possible implementation, the first clipping module 11 may be in an RRU or an AAU on an intermediate frequency side, and the second clipping module 12 may be in a BBU on a baseband side, or may be in the RRU or the AAU on the intermediate frequency side. Intermediate frequency clipping processing on the input signal is implemented based on collaboration between the first clipping module 11 and the second clipping module 12.

Based on the PAPR suppression apparatus in this implementation, PAPR suppression is performed based on collaboration between the two clipping modules. In comparison with a simple configuration of a clipping parameter in a related technology (a typical scenario), the foregoing implementation is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature is simpler. This resolves a technical problem that a static clipping algorithm is excessively complex or an application scenario is limited in the related technology.

In another possible implementation, in a bypass mode, the second clipping module 12 is further configured to obtain an input signal, and output the input signal to the first clipping module 11. The first clipping module 11 is configured to perform third clipping processing on the input signal based on a clipping parameter corresponding to a carrier parameter of the input signal. The clipping parameter is configured for different carriers based on a statistical feature of peak distribution of the input signal. Alternatively, the second clipping module 12 may not be deployed. The first clipping module 11 directly obtains the input signal, and performs third clipping processing on the input signal based on the clipping parameter corresponding to the carrier parameter of the input signal.

In a possible implementation, the carrier parameter may be an inter-carrier power ratio, and the clipping parameter may be a weighting coefficient of clipping noise. The first clipping module 11 is configured to determine the weighting coefficient of the clipping noise based on the clipping parameter corresponding to inter-carrier power ratio.

In this implementation, the clipping parameter is configured for different carriers based on the statistical feature of the peak distribution of the input signal. The first clipping module may adaptively adjust the weighting coefficient of the clipping noise based on the inter-carrier power ratio of the input signal, and perform third clipping processing on the input signal based on the weighting coefficient of the clipping noise.

Based on the PAPR suppression apparatus in the foregoing implementation, adaptive weighted allocation on the clipping noise by the first clipping module 11 is implemented in a manner of configuring different clipping parameters for different carrier configurations based on the statistical feature of the peak distribution of the input signal. In comparison with the simple configuration of the clipping parameter in the related technology (the typical scenario), the foregoing implementation is applicable to a plurality of scenarios. It is ensured that no clipping is missed, the PAPR is controllable, and the power amplifier is protected. In comparison with the manner in which each peak value needs to be extracted for clipping processing in the strict scenario, this manner of pre-configuring the clipping parameter based on the statistical feature in this application is simpler.

In addition, based on the PAPR suppression apparatus in the foregoing implementation, the clipping noise may be adaptively allocated based on the inter-carrier power ratio, so that the clipping noise is better allocated, to ensure system performance. The following describes the PAPR suppression apparatus in detail by using several different implementations.

The Second Clipping Module 12 is in the Bypass Mode, and the First Clipping Module 11 Performs Adaptive Clipping.

Figure 4:
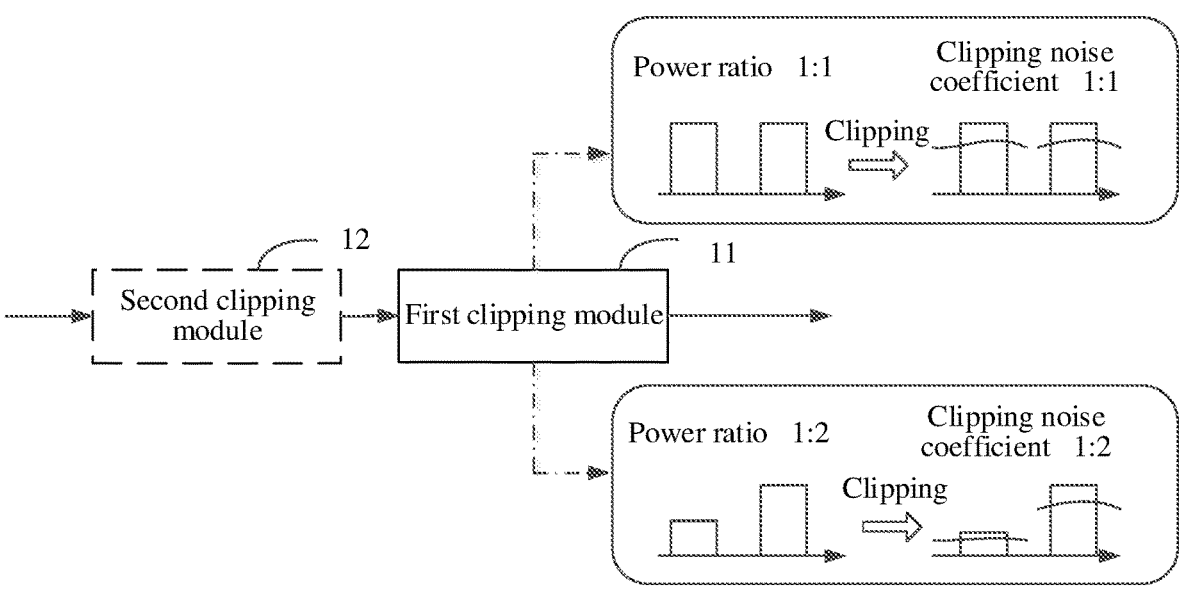
FIG. 4 is a block diagram of a PAPR suppression apparatus according to an embodiment.

FIG. 4 is a block diagram of a PAPR suppression apparatus according to an embodiment of this disclosure.

In this implementation, a general input condition of the first clipping module 11 may be set, so that all input signals can satisfy the input condition. In this way, the second clipping module 12 may work in a bypass mode, and perform no processing on the input signal. After obtaining the input signal, the second clipping module 12 may directly output the input signal to an input end of the first clipping module 11. As shown in FIG. 4, the second clipping module 12 is represented by a dashed box, and works in the bypass mode.

Alternatively, in this implementation, the second clipping module 12 may not be deployed, and only the first clipping module 11 is deployed. The first clipping module 11 may directly obtain the input signal, and perform third clipping processing on the input signal based on a clipping parameter corresponding to a carrier parameter of the input signal.

For the first clipping module 11, it can be learned from the foregoing descriptions that the corresponding clipping parameter may be configured in the first clipping module 11 based on a statistical feature that is of peak distribution of the input signal and that is obtained through statistics collection. The statistical feature of the peak distribution may be a feature of a carrier, for example, an inter-carrier power configuration, a modulation scheme of the carrier, or a spectrum occupation status of the carrier. In an implementation, different clipping parameters may be configured for different carriers based on the statistical feature of the peak distribution of the input signal. In this way, the first clipping module 11 may adaptively perform third clipping processing on the input signal based on the carrier parameter of the input signal and the clipping parameter that is configured based on the statistical feature of the carrier.

In a possible implementation, different carriers of the input signal and clipping parameters corresponding to the different carriers may be recorded in a form of a table. In this way, the first clipping module 11 may obtain the corresponding clipping parameter by querying the table based on the carrier parameter of the input signal.

For example, an inter-carrier power ratio is used as an example. As shown in FIG. 4, assuming that inter-carrier power ratios include 1:2 and 1:1 based on statistics, clipping parameters respectively corresponding to 1:2 and 1:1 may be configured in the first clipping module 11. For example, it may be configured that a corresponding weighting coefficient of clipping noise is 1:2 when the inter-carrier power ratio is 1:2, and that a corresponding weighting coefficient of clipping noise is 1:1 when the inter-carrier power ratio is 1:1. In this way, when the first clipping module 11 receives the input signal, if it is determined, based on instantaneous information of the input signal, that an inter-carrier power ratio of the input signal is 1:2, the first clipping module 11 may perform third clipping processing on the input signal by using the weighting coefficient 1:2 of the clipping noise, in other words, an allocation ratio of the clipping noise between carriers during clipping is 1:2. As shown in FIG. 4, when the inter-carrier power ratio is 1:2, an input signal with a low power corresponds to weak clipping noise (1), and an input signal with a high power corresponds to strong clipping noise (2). If it is determined, based on the instantaneous information of the input signal, that the inter-carrier power ratio of the input signal is 1:1, the first clipping module 11 may perform third clipping processing on the input signal by using the weighting coefficient 1:1 of the clipping noise, in other words, the allocation ratio of the clipping noise between the carriers during clipping is 1:1. As shown in FIG. 4, when the inter-carrier power ratio is 1:1, the clipping noise between the carriers is also in a 1:1 relationship during clipping, that is, the clipping noise allocated to the two carriers is the same. It is to be noted that the first clipping module 11 shown in FIG. 4 is merely some examples of this application, and does not limit this application in any manner. The corresponding clipping parameter may alternatively be set based on another inter-carrier power ratio (for example, 1:5 or 1:10). The corresponding clipping parameter may alternatively be configured based on a statistical feature of other instantaneous information between the carriers. For example, the corresponding clipping parameter may be configured based on a statistical feature of instantaneous information such as an inter-carrier modulation scheme or a spectrum occupation status.

Based on the PAPR suppression apparatus in the foregoing implementation, adaptive weighted allocation on the clipping noise by the first clipping module 11 is implemented in a manner of configuring different clipping parameters for different carrier configurations based on the statistical feature of the peak distribution of the input signal. In comparison with the simple configuration of the clipping parameter in the related technology (the typical scenario), the foregoing implementation is applicable to a plurality of scenarios. It is ensured that no clipping is missed, the PAPR is controllable, and the power amplifier is protected. In comparison with the manner in which each peak value needs to be extracted for clipping processing in the strict scenario, this manner of pre-configuring the clipping parameter based on the statistical feature in this application is simpler.

In addition, based on the PAPR suppression apparatus in the foregoing implementation of this application, the clipping noise may be adaptively allocated based on the inter-carrier power ratio, so that the clipping noise is better allocated, to ensure system performance.

In another embodiment, the second clipping module may be deployed in a communication device, or the second clipping module that has been deployed in the communication device determines, based on a carrier parameter of an input signal and the input condition, whether to enable clipping, and does not perform bypass on the signal. In this implementation, the second clipping module may output, to the first clipping module, a to-be-clipped signal that satisfies the input condition of the first clipping module. The first clipping module performs first clipping processing on the to-be-clipped signal, to obtain a first clipped signal. The second clipping module is configured to: when the carrier parameter of the input signal does not satisfy the input condition of the first clipping module, perform second clipping processing on the input signal based on the carrier parameter of the input signal and the input condition, to obtain the to-be-clipped signal; or when the carrier parameter of the input signal satisfies the input condition of the first clipping module, output the input signal, which is used as the to-be-clipped signal, to the first clipping module.

In other words, when the carrier parameter of the input signal does not satisfy the input condition of the first clipping module 11, the second clipping module 12 performs second clipping processing on the input signal based on the carrier parameter of the input signal and the input condition, to obtain the to-be-clipped signal, where a carrier parameter of the to-be-clipped signal may satisfy the input condition of the first clipping module. Then, the first clipping module 11 performs first clipping processing on the to-be-clipped signal, to obtain the first clipped signal.

Based on the PAPR suppression apparatus in the foregoing implementation of this application, an adaptive clipping process is implemented based on collaboration between the two clipping modules. This implementation is simple and is applicable to more application scenarios.

The PAPR suppression apparatus in this implementation may alternatively include a plurality of different implementations. For example, the first clipping module 11 may be an adaptive clipping module or may not be an adaptive clipping module, and the second clipping module 12 may be a module that adaptively enables clipping.

The Second Clipping Module 12 is Adaptively Enabled, and the First Clipping Module 11 Performs Static Clipping.

In this implementation, the input condition of the first clipping module may be a static first inter-carrier statistical feature. The second clipping module is configured to: when the carrier parameter of the input signal does not satisfy the first inter-carrier statistical feature, perform second clipping processing on the input signal based on the carrier parameter of the input signal and the first inter-carrier statistical feature, to obtain the to-be-clipped signal, where a carrier parameter of the to-be-clipped signal satisfies the first inter-carrier statistical feature. The first clipping module is configured to perform first clipping processing on the to-be-clipped signal based on a clipping parameter corresponding to the first inter-carrier statistical feature, to obtain the first clipped signal.

The first inter-carrier statistical feature may be a long-term statistical feature between carriers of a signal. In the first clipping module 11, a corresponding static clipping parameter may be configured based on the first inter-carrier statistical feature. After configuration, the first inter-carrier statistical feature and the corresponding static clipping parameter are no longer updated. Therefore, the first inter-carrier statistical feature is static, and the clipping parameter corresponding to the first inter-carrier statistical feature is the static clipping parameter. In this way, the first clipping module 11 may search for the corresponding static clipping parameter based on the carrier parameter of the input signal, and perform first clipping processing on the input signal based on the found static clipping parameter.

In this implementation, the second clipping module 12 is responsible for performing second clipping processing on the input signal whose carrier parameter does not satisfy the first inter-carrier statistical feature, to obtain the to-be-clipped signal that satisfies the first inter-carrier statistical feature. In this way, the to-be-clipped signal input into the first clipping module 11 satisfies an entry condition (the first inter-carrier statistical feature) of the first clipping module 11, and the first clipping module 11 may perform first clipping processing on the first clipped signal based on the clipping parameter corresponding to the first inter-carrier statistical feature.

To obtain the to-be-clipped signal that satisfies the first inter-carrier statistical feature, the second clipping module 12 may perform second clipping processing on the input signal based on the carrier parameter of the input signal and the first inter-carrier statistical feature. For example, the second clipping module 12 may perform second clipping processing based on a difference between the carrier parameter of the input signal and the first inter-carrier statistical feature. For example, the first inter-carrier statistical feature is an inter-carrier power ratio. It is assumed that the clipping parameter in the first clipping module 11 is configured based on an inter-carrier power ratio being 1:1. When an inter-carrier power ratio of the input signal input to the first clipping module 11 satisfies 1:1, first clipping processing may be performed on the input signal based on the configured clipping parameter. When the inter-carrier power ratio of the input signal of the second clipping module 12 does not satisfy 1:1, the second clipping module 12 may perform second clipping processing on the input signal, to clip a part of peak values of a high-power carrier in advance, so that no clipping is missed even if first clipping processing is performed, based on a weighting coefficient that is of clipping noise and that is configured when the inter-carrier power ratio is 1:1, on the to-be-clipped signal that enters the first clipping module after second clipping processing.

Figure 5:
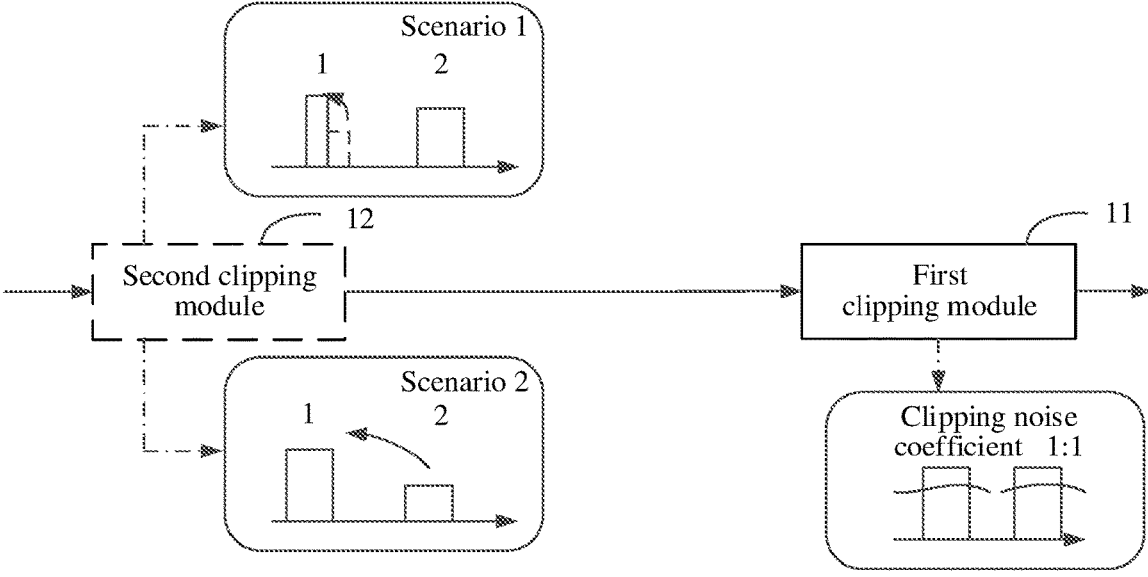
FIG. 5 is a block diagram of a PAPR suppression apparatus according to an embodiment.

FIG. 5 is a block diagram of a PAPR suppression apparatus according to an embodiment. In an example shown in FIG. 5, a static clipping parameter configured in a first clipping module 11 when an inter-carrier power ratio is 1:1 is a weighting coefficient 1:1 of clipping noise. The first clipping module 11 is in an enabled state. When a carrier parameter (the inter-carrier power ratio) of an input signal is different from a first inter-carrier statistical feature, in other words, the inter-carrier power ratio of the input signal does not satisfy the first inter-carrier statistical feature (the inter-carrier power ratio 1:1), a second clipping module 12 may perform second clipping processing on the input signal, to clip a part of peak values of a high-power carrier in advance, so that no clipping is missed even if first clipping processing is performed, based on the weighting coefficient that is of the clipping noise and that is configured when the inter-carrier power ratio is 1:1, on the to-be-clipped signal that enters the first clipping module 11 after second clipping processing.

FIG. 5 shows two examples in which the carrier parameter of the input signal does not satisfy the first inter-carrier statistical feature. For example, the first inter-carrier statistical feature is an inter-carrier power ratio. In a scenario 2 in FIG. 5, a carrier 2 lends power of the carrier 2 to a carrier 1, causing an increase in power in a bandwidth of the carrier 1. Consequently, there is a deviation between 1:1 and an inter-carrier power ratio between the carrier 1 and the carriers 2, and the first clipping module 11 misses clipping. In this case, the second clipping module 12 is enabled, and performs clipping on the carrier 1, to clip a part of peak values in advance, so as to ensure that a to-be-clipped signal sent to the first clipping module 11 satisfies a peak distribution feature, and ensure that the first clipping module 11 does not miss clipping. Because the carrier 2 is a power lender, a peak to average power ratio is not a problem for a power amplifier. Therefore, the second clipping module 12 does not perform clipping on the carrier 2, and directly sends the carrier 2 to the first clipping module 11. In other words, in the scenario 2 shown in FIG. 5, the second clipping module 12 clips a part of power of the carrier 1, so that the carrier 1 and the carrier 2 are sent to the first clipping module 11 after a peak to average ratio between the carrier 1 and the carrier 2 satisfies 1:1.

For example, the first inter-carrier statistical feature is a power spectral density. In a scenario 1 shown in FIG. 5, in a carrier 1, power of a part of bandwidth (which is 5M and is represented by dashed lines) is lent to another bandwidth (which is 5M and is represented by thin solid lines), causing an increase in power of the thin-solid-line bandwidth shown in FIG. 5, and the first clipping module 11 misses clipping. In this case, the second clipping module 12 is enabled, and performs clipping on the carrier 1, to clip a part of peak values in advance, so as to ensure that a signal sent to the first clipping module 11 satisfies a peak distribution feature, and ensure that the clipping module 1 does not miss clipping. Because a carrier 2 does not lend power, the second clipping module 12 does not perform clipping on the carrier 2, and directly sends the carrier 2 to the first clipping module 11.

Based on the PAPR suppression apparatus in the foregoing implementation of this application, according to a process in which the second clipping module 12 adaptively enables clipping processing based on a relationship between the input signal and the first inter-carrier statistical feature and performs clipping processing on the input signal, PAPR control of a signal in any scenario is applicable, and an implementation is simple.

The Second Clipping Module 12 Adaptively Enables Clipping, and the First Clipping Module 11 Performs Adaptive Clipping.

In this implementation, the input condition of the first clipping module is a dynamic second carrier statistical feature, and the first clipping module is further configured to periodically update the second carrier statistical feature and a clipping parameter corresponding to the second carrier statistical feature.

The second clipping module is configured to: when the carrier parameter of the input signal does not satisfy the second inter-carrier statistical feature, perform second clipping processing on the input signal based on the carrier parameter of the input signal and the second inter-carrier statistical feature, to obtain the to-be-clipped signal, where a carrier parameter of the to-be-clipped signal satisfies the second inter-carrier statistical feature. The first clipping module is configured to perform first clipping processing on the to-be-clipped signal based on the clipping parameter corresponding to the second inter-carrier statistical feature, to obtain the first clipped signal.

The second inter-carrier statistical feature may be a short-term inter-carrier statistical feature obtained through periodic statistics collection. The first clipping module 11 may configure a corresponding clipping parameter based on a new second inter-carrier statistical feature obtained through statistics collection in each periodicity, in other words, periodically update the configured clipping parameter based on a statistical periodicity. Duration of each periodicity may be determined based on a specific application scenario. This is not limited in this application. Therefore, the first clipping module 11 may also perform adaptive clipping processing on the input signal as time changes.

A process in which the second clipping module 12 processes the input signal is the same as a processing process in the foregoing implementation, except that the second inter-carrier statistical feature also changes with time when whether the carrier parameter of the input signal satisfies the second inter-carrier statistical feature is determined as time changes. The second inter-carrier statistical feature based on which the second clipping module 12 performs second clipping processing on the input signal also periodically changes with time.

Figure 6:
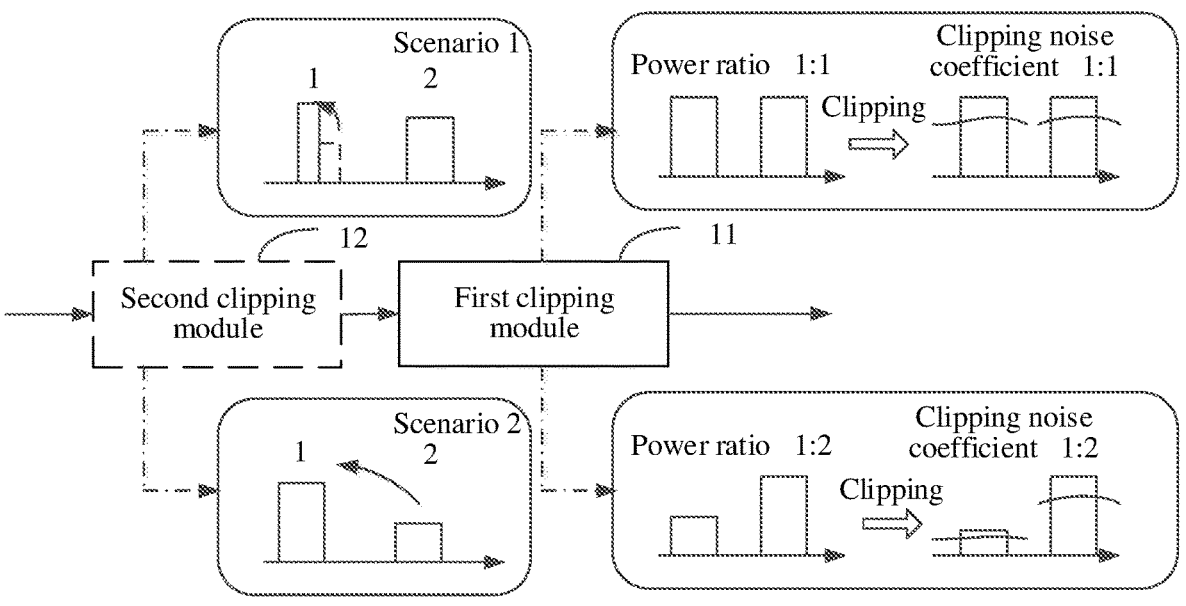
FIG. 6 is a block diagram of a PAPR suppression apparatus according to an embodiment.

FIG. 6 is a block diagram of a PAPR suppression apparatus according to an embodiment of this application. In an example shown in FIG. 6, a clipping parameter configured in a first clipping module 11 based on an inter-carrier power ratio 1:1 or 1:2 is a weighting coefficient 1:1 or 1:2 of clipping noise. The first clipping module 11 is in an enabled state. When a carrier parameter of an input signal is different from a second inter-carrier statistical feature, in other words, an inter-carrier power ratio of the input signal is not any one of configured second inter-carrier statistical features, a second clipping module 12 may perform second clipping processing on the input signal to obtain a to-be-clipped signal that satisfies the second inter-carrier statistical feature, and output the to-be-clipped signal to the first clipping module 11. The second inter-carrier power configuration 1:1 or 1:2 configured in the first clipping module 11 and the corresponding weighting coefficient 1:1 or 1:2 of the clipping noise may be updated based on a statistical feature of a new periodicity and a corresponding clipping parameter.

Based on the PAPR suppression apparatus in the foregoing implementation of this application, according to a process in which the second clipping module 12 adaptively enables clipping processing based on a relationship between the input signal and the second inter-carrier statistical feature and performs clipping processing on the input signal, the first clipping module 11 periodically collects statistics of an inter-carrier feature of the input signal, and updates, based on the inter-carrier feature obtained through statistics collection, the second inter-carrier statistical feature and the corresponding clipping parameter that are locally configured, so that adaptive clipping processing can also be implemented. Based on collaboration between the two modules that can perform adaptive clipping processing, PAPR control of a signal in any scenario is applicable, and an implementation is simple.

This disclosure further provides a PAPR suppression method, applied to a communication device. In a possible implementation, the communication device may include a first clipping module and a second clipping module. An input end of the second clipping module is configured to receive an input signal, and an output end of the second clipping module is connected to an input end of the first clipping module.

Figure 7:
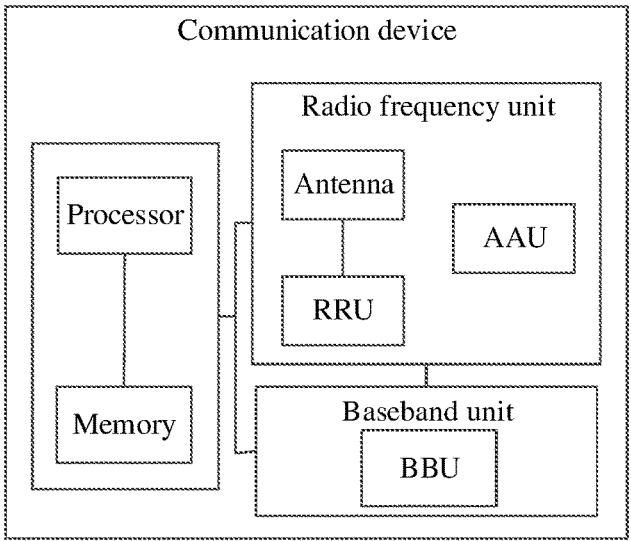
FIG. 7 is a block diagram of a communication device according to an embodiment.

This disclosure further provides a communication device. FIG. 7 is a block diagram of a communication device according to an embodiment of this application. The communication device shown in FIG. 7 may be a base station. In a possible implementation, the communication device shown in FIG. 7 may include a baseband unit and a radio frequency unit. The baseband unit may include a BBU. The radio frequency unit may include an RRU and an antenna, and/or an AAU.

In a possible implementation, the PAPR suppression apparatus in the foregoing implementation of this application may be disposed in the RRU or the AAU. In another possible implementation, the first clipping module may be in the RRU or the AAU, and the second clipping module is in the BBU.

The communication device may further include one or more processors and one or more memories. The memory may store executable instructions corresponding to the PAPR suppression method provided in this application. The processor may be configured to implement, when executing the executable instructions stored in the memory, the PAPR suppression method provided in this application.

Connection relationships between the processor and the memory and between the baseband unit and the radio frequency unit in FIG. 7 are merely examples of this application, and do not limit this application in any manner. For example, the processor and the memory may alternatively be disposed in the BBU, the RRU, and the AAU separately. In other words, the processor and the memory are separately disposed in the BBU, the RRU, and the AAU.

The processor may be a field programmable gate array (FPGA), an application-specific integrated circuit (ASIC), a system on chip (SoC), a central processing unit (CPU), a network processor (NP), a digital signal processor (DSP), a microcontroller unit (MCU), a programmable logic device (PLD), or another integrated chip.

The memory may be a read-only memory (ROM) or another type of static storage device that can store static information and instructions, or a random access memory (RAM) or another type of dynamic storage device that can store information and instructions. The memory may alternatively include a non-volatile memory (non-volatile memory), for example, a flash memory (flash memory), a hard disk drive (HDD), or a solid-state drive (SSD). The memory may alternatively include a combination of the foregoing types of memories. The memory may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store desired program code in a form of an instruction or a data structure and that can be accessed by a computer. However, the memory is not limited thereto. The memory may exist independently, and is connected to the processor through a communication line. The memory may alternatively be integrated with the processor. The memory provided in embodiments of this application may be usually non-volatile. The memory is configured to store computer-executable instructions for executing the solutions in this application, and execution is controlled by the processor. The processor is configured to execute the computer-executable instructions stored in the memory, to implement a method provided in embodiments of this application.

FIG. 8 is a flowchart of a PAPR suppression method according to an embodiment. As shown in FIG. 8, the method may include the following steps.

Step S701: A communication device controls a second clipping module to output, to a first clipping module, a to-be-clipped signal that satisfies an input condition of the first clipping module, where the input condition includes a peak distribution feature of an input signal.

Step S702: The communication device performs first clipping processing on the to-be-clipped signal by using the first clipping module, to obtain a first clipped signal.

In a possible implementation, the communication device may determine, depending on whether a carrier parameter of the input signal satisfies the input condition of the first clipping module, whether to enable the second clipping module to perform second clipping processing on the input signal, where the input condition includes the peak distribution feature of the input signal.

FIG. 9 is a flowchart of a PAPR suppression method according to an embodiment. As shown in FIG. 9, in a possible implementation:

Step S701: A communication device controls a second clipping module to output, to a first clipping module, a to-be-clipped signal that satisfies an input condition of the first clipping module may include the following steps.

Step S7011: When the carrier parameter of the input signal does not satisfy the input condition of the first clipping module, the second clipping module 12 of the communication device performs second clipping processing on the input signal based on the carrier parameter of the input signal and the input condition, to obtain the to-be-clipped signal.

Step S7012: When the carrier parameter of the input signal satisfies the input condition of the first clipping module, the second clipping module 12 of the communication device outputs the input signal, which is used as the to-be-clipped signal, to the first clipping module 11.

In other words, when the carrier parameter of the input signal does not satisfy the input condition of the first clipping module 11, the communication device performs, by using the second clipping module 12, second clipping processing on the input signal based on the carrier parameter of the input signal and the input condition, to obtain the to-be-clipped signal, where a carrier parameter of the to-be-clipped signal may satisfy the input condition of the first clipping module. Then, the first clipping module 11 is used to perform first clipping processing on the to-be-clipped signal, to obtain the first clipped signal. When the carrier parameter of the input signal satisfies the input condition of the first clipping module 11, the communication device directly outputs the input signal, which is used as the to-be-clipped signal, to the first clipping module 11 by using the second clipping module 12, and then performs first clipping processing on the to-be-clipped signal by using the first clipping module 11, to obtain the first clipped signal.

According to the PAPR suppression method in the foregoing implementation, an adaptive clipping process is implemented based on collaboration between the two clipping modules. This implementation is simple and is applicable to more application scenarios.

With reference to the PAPR suppression apparatus shown in FIG. 2, the communication device may determine, depending on whether the carrier parameter of the input signal satisfies the input condition of the first clipping module 11, whether to enable the second clipping module 12 to perform second clipping processing on the input signal.

In a possible implementation, that a communication device controls a second clipping module to output, to a first clipping module, a to-be-clipped signal that satisfies an input condition of the first clipping module may include: When the carrier parameter of the input signal satisfies the input condition of the first clipping module, the communication device skips enabling the second clipping module. When the carrier parameter of the input signal satisfies the input condition of the first clipping module 11, the communication device may skip enabling the second clipping module 12 to perform clipping processing on the input signal, that is, disable clipping processing performed on the input signal. In other words, when the carrier parameter of the input signal satisfies the input condition of the first clipping module 11, the second clipping module 12 in the communication device outputs the input signal, which is used as the to-be-clipped signal, to the first clipping module 11.

For the input signal that satisfies the input condition, the communication device performs first clipping processing on the input signal by using the first clipping module 11, where the input condition includes the peak distribution feature of the input signal. The peak distribution feature of the input signal may include a statistical feature of peak distribution of the input signal, for example, an inter-carrier power ratio of the input signal, a modulation scheme of a carrier, or a spectrum occupation status of a carrier that are obtained through statistics collection. In other words, the communication device may configure a corresponding clipping parameter in the first clipping module 11 based on the statistical feature of the peak distribution of the input signal. When the carrier parameter of the input signal satisfies the input condition, the communication device may perform first clipping processing on the input signal based on the carrier parameter of the input signal and the clipping parameter.

In a possible implementation, that a communication device controls a second clipping module to output, to a first clipping module, a to-be-clipped signal that satisfies an input condition of the first clipping module may further include: When the carrier parameter of the input signal does not satisfy the input condition of the first clipping module 11, the communication device controls the second clipping module to perform second clipping processing on the input signal based on the carrier parameter of the input signal and the input condition, to obtain the to-be-clipped signal. When the carrier parameter of the input signal does not satisfy the input condition of the first clipping module 11, the communication device may determine to enable the second clipping module 12 to perform second clipping processing on the input signal based on the carrier parameter of the input signal and the input condition. Specifically, second clipping processing may be performed on the input signal based on a difference between the carrier parameter of the input signal and the input condition, to obtain the to-be-clipped signal, where the carrier parameter of the to-be-clipped signal satisfies the input condition. Then, the first clipping module 11 performs first clipping processing on the to-be-clipped signal based on the clipping parameter corresponding to the input condition, to obtain the first clipped signal.

According to the PAPR suppression method provided in this implementation, PAPR suppression is performed based on collaboration between the two clipping modules. In comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature in this application is simpler. This resolves a technical problem that a static clipping algorithm is excessively complex or an application scenario is limited in the related technology.

In a possible implementation, the method further includes:

When the communication device controls the second clipping module to work in a bypass mode, the second clipping module outputs the received input signal to an input end of the first clipping module. The communication device performs, by using the first clipping module, third clipping processing on the input signal based on a clipping parameter corresponding to the carrier parameter of the input signal, where the clipping parameter is configured for different carriers based on a statistical feature of peak distribution of the input signal.

With reference to the PAPR suppression apparatus shown in FIG. 4, in this implementation, the communication device may set a broad input condition of the first clipping module 11, so that all input signals can satisfy the input condition. In this way, the communication device may control the second clipping module 12 to work in the bypass mode, perform no processing on the input signal, and output the received input signal to the first clipping module 11. As shown in FIG. 4, the second clipping module 12 is represented by a dashed box, and works in the bypass mode.

For the first clipping module 11, it can be learned from the foregoing descriptions that the corresponding clipping parameter may be configured in the first clipping module 11 based on a statistical feature that is of peak distribution of the input signal and that is obtained through statistics collection. The statistical feature of the peak distribution may be a feature of a carrier, for example, an inter-carrier power configuration, a modulation scheme of the carrier, or a spectrum occupation status of the carrier. In a possible implementation, different clipping parameters may be configured for different carriers based on the statistical feature of the peak distribution of the input signal. In this way, the first clipping module 11 may adaptively adjust a weighting coefficient of clipping noise based on the carrier parameter of the input signal and a clipping parameter configured based on a carrier feature, and perform clipping processing on the input signal based on the weighting coefficient of the clipping noise.

In a possible implementation, the carrier parameter may be an inter-carrier power ratio, and the clipping parameter may be a weighting coefficient of clipping noise. That the communication device performs, by using the first clipping module, clipping processing on the input signal based on a clipping parameter corresponding to the carrier parameter of the input signal includes: The communication device performs, by using the first clipping module, clipping processing on the input signal based on the weighting coefficient that is of the clipping noise and that corresponds to the inter-carrier power ratio.

According to the PAPR suppression method in the foregoing implementation of this application, adaptive weighted allocation on the clipping noise by the first clipping module 11 is implemented in a manner of configuring different clipping parameters for different carrier configurations based on the statistical feature of the peak distribution of the input signal. In comparison with the simple configuration of the clipping parameter in the related technology (the typical scenario), the foregoing implementation of this application is applicable to a plurality of scenarios. It is ensured that no clipping is missed, the PAPR is controllable, and the power amplifier is protected. In comparison with the manner in which each peak value needs to be extracted for clipping processing in the strict scenario, this manner of pre-config-uring the clipping parameter based on the statistical feature in this application is simpler.

In addition, based on the PAPR suppression apparatus in the foregoing implementation of this application, the clipping noise may be adaptively allocated based on the inter-carrier power ratio, so that the clipping noise is better allocated, to ensure system performance.

The PAPR suppression apparatus in the implementations shown in FIG. 8 and FIG. 9 may alternatively include a plurality of different implementations. For example, the first clipping module 11 may be an adaptive clipping module or may not be an adaptive clipping module, and the second clipping module 12 may be a module that adaptively enables clipping.

In a possible implementation, the input condition of the first clipping module is a static first inter-carrier statistical feature, and the method further includes: The communication device configures, in the first clipping module based on the first inter-carrier statistical feature, a clipping parameter corresponding to the first inter-carrier statistical feature.

The first inter-carrier statistical feature may be a long-term statistical feature between carriers of a signal. The communication device may configure a corresponding static clipping parameter in the first clipping module 11 based on the first inter-carrier statistical feature, and the static clipping parameter is not updated after being configured. In this way, the communication device may search for the corresponding static clipping parameter based on the carrier parameter of the input signal, and perform clipping on the input signal based on the found static clipping parameter by using the first clipping module 11.

In this implementation, step S7011 in which the second clipping module 12 of the communication device performs second clipping processing on the input signal based on the carrier parameter of the input signal and the input condition when the carrier parameter of the input signal does not satisfy the input condition of the first clipping module, to obtain the to-be-clipped signal may include:

The second clipping module of the communication device performs second clipping processing on the input signal based on the carrier parameter of the input signal and the first inter-carrier statistical feature when the carrier param-eter of the input signal does not satisfy the first inter-carrier statistical feature, to obtain the to-be-clipped signal, where the carrier parameter of the to-be-clipped signal satisfies the first inter-carrier statistical feature.

Step S702 in which the communication device performs first clipping processing on the to-be-clipped signal by using the first clipping module, to obtain a first clipped signal may include:

The communication device performs, by using the first clipping module, first clipping processing on the to-be-clipped signal based on the clipping parameter correspond-ing to the first inter-carrier statistical feature, to obtain the first clipped signal.

With reference to the PAPR suppression apparatus shown in FIG. 5, in this implementation, the communication device performs, by using the second clipping module 12, second clipping processing on the input signal whose carrier param-eter does not satisfy the first inter-carrier statistical feature, to clip a part of peak values of a high-power carrier in advance. In this way, the to-be-clipped signal input into the first clipping module 11 satisfies an entry condition (the first inter-carrier statistical feature) of the first clipping module 11, and the communication device may perform first clip-ping processing on the to-be-clipped signal by using the clipping parameter configured by the first clipping module based on the first inter-carrier statistical feature, so that no clipping is missed.

According to the PAPR suppression method in the fore-going implementation of this application, according to a process in which the second clipping module 12 adaptively enables clipping processing based on a relationship between the input signal and the first inter-carrier statistical feature and performs clipping processing on the input signal, PAPR control of a signal in any scenario is applicable, and an implementation is simple.

In another possible implementation, the input condition of the first clipping module is a dynamic second inter-carrier statistical feature, and the method further includes: The communication device periodically obtains a new second carrier statistical feature, and configures, in the first clipping module based on the new second carrier statistical feature, a clipping parameter corresponding to the second carrier statistical feature.

The second inter-carrier statistical feature may be a short-term inter-carrier statistical feature obtained through periodic statistics collection. The communication device may configure, in the first clipping module 11, a corresponding clipping parameter based on a new second inter-carrier statistical feature obtained through statistics collection in each periodicity, in other words, periodically update the configured clipping parameter based on a statistical periodicity. Duration of each periodicity may be determined based on a specific application scenario. This is not limited in this application. Therefore, the first clipping module 11 may also perform adaptive clipping processing on the input signal as time changes.

In this implementation, step S7011 in which the second clipping module 12 of the communication device performs second clipping processing on the input signal based on the carrier parameter of the input signal and the input condition when the carrier parameter of the input signal does not satisfy the input condition of the first clipping module, to obtain the to-be-clipped signal may include:

When the carrier parameter of the input signal does not satisfy the second inter-carrier statistical feature, the second clipping module 12 of the communication device performs second clipping processing on the input signal based on the carrier parameter of the input signal and the second inter-carrier statistical feature, to obtain the to-be-clipped signal, where the carrier parameter of the to-be-clipped signal satisfies the second inter-carrier statistical feature.

Step S702 in which the communication device performs first clipping processing on the to-be-clipped signal by using the first clipping module, to obtain a first clipped signal may include:

The communication device performs, by using the first clipping module, first clipping processing on the to-be-clipped signal based on the clipping parameter corresponding to the second inter-carrier statistical feature, to obtain the first clipped signal.

With reference to the PAPR suppression apparatus shown in FIG. 6, in this implementation, a process in which the second clipping module 12 processes the input signal is the same as a processing process in the foregoing implementation, except that the second inter-carrier statistical feature also changes with time when whether the carrier parameter of the input signal satisfies the second inter-carrier statistical feature is determined as time changes. When the second clipping module 12 performs second clipping processing on the input signal, a referred second inter-carrier statistical feature also periodically changes with time.

According to the PAPR suppression method in the foregoing implementation of this application, according to a process in which the second clipping module 12 adaptively enables clipping processing based on a relationship between the input signal and the second inter-carrier statistical feature and performs clipping processing on the input signal, the first clipping module 11 periodically collects statistics of an inter-carrier feature of the input signal, and updates, based on the inter-carrier feature obtained through statistics collection, the second inter-carrier statistical feature and the corresponding clipping parameter that are locally configured, so that adaptive clipping processing can also be implemented. Based on collaboration between the two modules that can perform adaptive clipping processing, PAPR control of a signal in any scenario is applicable, and an implementation is simple.

In a possible implementation, the carrier parameter of the input signal, the first inter-carrier statistical feature, and the second carrier statistical feature each are an inter-carrier power ratio. Alternatively, the carrier parameter of the input signal, the first inter-carrier statistical feature, and the second carrier statistical feature each may be another carrier feature such as a modulation scheme or a spectrum occupation status of a carrier. This is not limited in this application.

This application further provides a PAPR suppression method, applied to a communication device. The communication device may be the RRU or the AAU described above, or may be the communication device shown in FIG. 3 or FIG. 7. This is not limited in this application.

FIG. 10 is a flowchart of a PAPR suppression method according to an embodiment of this application. As shown in FIG. 10, the PAPR suppression method in this application may include the following steps.

Step S100: A communication device performs second clipping processing on an input signal whose carrier parameter does not satisfy an input condition, to obtain a to-be-clipped signal, and performs first clipping processing on the to-be-clipped signal, to obtain a first clipped signal.

The input condition includes a peak distribution feature of an input signal, and a carrier parameter of the to-be-clipped signal satisfies the input condition.

As described above, the peak distribution feature of the input signal may include a statistical feature of peak distribution of the input signal. The peak distribution feature of the input signal is mainly affected by factors such as an inter-carrier power ratio of the input signal, a modulation scheme of a carrier, and a spectrum occupation status. The communication device configures a clipping parameter based on the statistical feature (the input condition) of the peak distribution of the input signal, performs second clipping processing on the input signal when the carrier parameter of the input signal does not satisfy the input condition, to obtain the to-be-clipped signal that satisfies the input condition, and then performs first clipping processing based on the clipping parameter corresponding to the input condition, to obtain the first clipped signal.

According to the PAPR suppression method in this application, preprocessing (second clipping processing) is performed on the input signal that does not satisfy the peak distribution feature, to obtain the to-be-clipped signal that satisfies the peak distribution feature, and then first clipping processing is performed on the to-be-clipped signal, to obtain the first clipped signal. In a manner of step-by-step processing and two-level clipping, in comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature and preprocessing the input signal in this application is simpler. This resolves a technical problem that a static clipping algorithm is excessively complex or an application scenario is limited in the related technology.

FIG. 11 is a flowchart of a PAPR suppression method according to an implementation of this application. In a possible implementation, the method may include the following steps.

Step S110: A communication device performs second clipping processing on an input signal whose carrier parameter does not satisfy an input condition, to obtain a to-be-clipped signal, and performs first clipping processing on the to-be-clipped signal, to obtain a first clipped signal.

Step S111: The communication device performs first clipping processing on an input signal whose carrier parameter satisfies the input condition, to obtain the first clipped signal.

For a process of step S110, refer to the foregoing descriptions of step S100. Details are not described again.

For step S111, when determining that the carrier parameter of the input signal satisfies the input condition, the communication device may directly perform first clipping processing on the input signal, to obtain the first clipped signal.

According to the PAPR suppression method in the foregoing implementation of this application, different clipping processes are used for the input signal based on a relationship between the carrier parameter of the input signal and the input condition. In comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature and preprocessing the input signal in this application is simpler. This resolves a technical problem that a static clipping algorithm is excessively complex or an application scenario is limited in the related technology.

In a possible implementation, step S100 (S110) in which a communication device performs second clipping processing on an input signal whose carrier parameter does not satisfy an input condition, to obtain a to-be-clipped signal may include:

The communication device performs second clipping processing on the input signal based on the carrier parameter of the input signal and the input condition when the carrier parameter of the input signal does not satisfy the input condition, to obtain the to-be-clipped signal.

In a possible implementation, the communication device may perform second clipping processing based on a difference between the carrier parameter of the input signal and the input condition. For example, the input condition is an inter-carrier power ratio. With reference to the example shown in FIG. 5, it is assumed that the clipping parameter is configured based on an inter-carrier power ratio 1:1. When an inter-carrier power ratio of the input signal satisfies 1:1, first clipping processing may be performed on the input signal based on the configured clipping parameter. When the inter-carrier power ratio of the input signal does not satisfy 1:1, the communication device may perform second clipping processing on the input signal, to clip a part of peak values of a high-power carrier in advance, so that no clipping is missed even if first clipping processing is performed, based on the weighting coefficient that is of the clipping noise and that is configured when the inter-carrier power ratio is 1:1, on the to-be-clipped signal that enters the first clipping module after second clipping processing.

According to the PAPR suppression method in the foregoing implementation of this application, according to a process in which second clipping processing is adaptively enabled based on a relationship between the input signal and the input condition and second clipping processing is performed on the input signal, PAPR control of a signal in any scenario is applicable, and an implementation is simple.

FIG. 12 is a flowchart of a PAPR suppression method according to an implementation of this application.

In a possible implementation, the input condition is a static first inter-carrier statistical feature. Step S100 (S110) may include:

Step S121: When the carrier parameter of the input signal does not satisfy the first inter-carrier statistical feature, the communication device performs second clipping processing on the input signal based on the carrier parameter of the input signal and the first inter-carrier statistical feature, to obtain the to-be-clipped signal, where a carrier parameter of the to-be-clipped signal satisfies the first inter-carrier statistical feature.

In this implementation, step S111 in which the communication device performs first clipping processing on the to-be-clipped signal, to obtain a first clipped signal may include:

Step S122: The communication device performs first clipping processing on the to-be-clipped signal based on a clipping parameter corresponding to the first inter-carrier statistical feature, to obtain the first clipped signal.

In a possible implementation, as shown in FIG. 12, the method may further include:

Step S120: The communication device configures, based on the first inter-carrier statistical feature, the clipping parameter corresponding to the first inter-carrier statistical feature.

As described above, the first inter-carrier statistical feature may be a long-term statistical feature between carriers of a signal. The communication device may configure a corresponding static clipping parameter based on the first inter-carrier statistical feature. After configuration, the first inter-carrier statistical feature and the corresponding static clipping parameter are no longer updated. In this way, the communication device may search for the corresponding static clipping parameter based on the carrier parameter of the input signal, and perform first clipping processing on the input signal based on the found static clipping parameter.

When the carrier parameter of the input signal does not satisfy the first inter-carrier statistical feature, the communication device may further perform second clipping processing on the input signal based on the carrier parameter of the input signal and the first inter-carrier statistical feature, to obtain the to-be-clipped signal, where the carrier parameter of the to-be-clipped signal satisfies the first inter-carrier statistical feature. Then, the communication device further performs first clipping processing on the to-be-clipped signal based on the clipping parameter corresponding to the first inter-carrier statistical feature, to obtain the first clipped signal.

According to the PAPR suppression method in the foregoing implementation of this application, according to a process in which clipping processing is adaptively enabled based on a relationship between the input signal and the first inter-carrier statistical feature and clipping processing is performed on the input signal, PAPR control of a signal in any scenario is applicable, and an implementation is simple.

FIG. 13 is a flowchart of a PAPR suppression method according to an implementation of this application.

In a possible implementation, the input condition is a dynamic second carrier statistical feature. As shown in FIG. 13, the method may include:

Step S130: The communication device periodically obtains a new second carrier statistical feature, and configures, based on the new second carrier statistical feature, a clipping parameter corresponding to the new second carrier statistical feature.

Step S100 (S110) may include:

Step S131: When the carrier parameter of the input signal does not satisfy the second inter-carrier statistical feature, the communication device performs second clipping processing on the input signal based on the carrier parameter of the input signal and the second inter-carrier statistical feature, to obtain the to-be-clipped signal, where a carrier parameter of the to-be-clipped signal satisfies the second inter-carrier statistical feature.

Step S111 in which the communication device performs first clipping processing on the to-be-clipped signal, to obtain a first clipped signal may include:

Step S132: The communication device performs first clipping processing on the to-be-clipped signal based on the clipping parameter corresponding to the second inter-carrier statistical feature, to obtain the first clipped signal.

As described above, the second inter-carrier statistical feature may be a short-term inter-carrier statistical feature obtained through periodic statistics collection. The communication device may configure a corresponding clipping parameter based on a new second inter-carrier statistical feature obtained through statistics collection in each periodicity, in other words, periodically update the configured clipping parameter based on a statistical periodicity. Duration of each periodicity may be determined based on a specific application scenario. This is not limited in this application. Therefore, first clipping processing may alternatively be a process in which adaptive clipping processing is performed on the input signal as time changes.

A specific process of second clipping processing in step S131 is the same as a processing process described above, except that the second inter-carrier statistical feature also changes with time when whether the carrier parameter of the input signal satisfies the second inter-carrier statistical feature is determined as time changes. When second clipping processing is performed on the input signal, a referred second inter-carrier statistical feature also periodically changes with time.

According to the PAPR suppression method in the foregoing implementation of this application, according to a process in which second clipping processing is adaptively enabled based on a relationship between the input signal and the second inter-carrier statistical feature and second clipping processing is performed on the input signal, statistics of an inter-carrier feature of the input signal is periodically collected, and the second inter-carrier statistical feature and the corresponding clipping parameter that are locally configured are updated based on the inter-carrier feature obtained through statistics collection, so that adaptive first clipping processing can also be implemented. Based on collaboration between the two processes in which adaptive clipping processing can be performed, PAPR control of a signal in any scenario is applicable, and an implementation is simple.

In a possible implementation, the method includes:

The communication device performs third clipping processing on the input signal based on a clipping parameter corresponding to the carrier parameter of the input signal. The clipping parameter is configured for different carriers based on a statistical feature of peak distribution of the input signal. The carrier parameter is an inter-carrier power ratio, and the clipping parameter is a weighting coefficient of clipping noise.

It can be learned from the foregoing descriptions that the corresponding clipping parameter may be configured based on a statistical feature that is of peak distribution of the input signal and that is obtained through statistics collection. The statistical feature of the peak distribution may be a feature of a carrier, for example, an inter-carrier power configuration, a modulation scheme of the carrier, and a spectrum occupation status of the carrier. In a possible implementation, different clipping parameters may be configured for different carriers based on the statistical feature of the peak distribution of the input signal. In this way, the communication device may adaptively adjust a weighting coefficient of clipping noise based on the carrier parameter of the input signal and a clipping parameter configured based on a carrier feature, and perform clipping processing on the input signal based on the weighting coefficient of the clipping noise.

According to the PAPR suppression method in the foregoing implementation of this application, adaptive weighted allocation on the clipping noise is implemented by the communication device in a manner of configuring different clipping parameters for different carrier configurations based on the statistical feature of the peak distribution of the input signal. In comparison with the simple configuration of the clipping parameter in the related technology (the typical scenario), the foregoing implementation of this application is applicable to a plurality of scenarios. It is ensured that no clipping is missed, the PAPR is controllable, and the power amplifier is protected. In comparison with the manner in which each peak value needs to be extracted for clipping processing in the strict scenario, this manner of pre-configuring the clipping parameter based on the statistical feature in this application is simpler.

An embodiment of this application further provides an adaptive peak to average power ratio PAPR suppression apparatus. The apparatus is used in a communication device. FIG. 14 is a block diagram of a PAPR suppression apparatus according to an embodiment of this application. As shown in FIG. 14, the apparatus may include:

a clipping unit 1400, configured to perform second clipping processing on an input signal whose carrier parameter does not satisfy an input condition, to obtain a to-be-clipped signal, and perform first clipping processing on the to-be-clipped signal, to obtain a first clipped signal, where the input condition includes a peak distribution feature of an input signal, and a carrier parameter of the to-be-clipped signal satisfies the input condition.

The PAPR suppression apparatus in this application performs preprocessing (second clipping processing) on the input signal that does not satisfy the peak distribution feature, to obtain the to-be-clipped signal that satisfies the peak distribution feature, and then performs first clipping processing on the to-be-clipped signal, to obtain the first clipped signal. In a manner of step-by-step processing and two-level clipping, in comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature and preprocessing the input signal in this application is simpler. This resolves a technical problem that a static clipping algorithm is excessively complex or an application scenario is limited in the related technology.

In a possible implementation, the clipping unit 1400 includes a second clipping module, configured to: perform second clipping processing on the input signal based on the carrier parameter of the input signal and the input condition when the carrier parameter of the input signal does not satisfy the input condition, to obtain the to-be-clipped signal.

In a possible implementation, the apparatus further includes a first clipping module, configured to perform first clipping processing on an input signal whose carrier parameter satisfies the input condition, to obtain the first clipped signal.

Based on the PAPR suppression apparatus in the foregoing implementation of this application, different clipping processes are used for the input signal based on a relationship between the carrier parameter of the input signal and the input condition. In comparison with a simple configuration of a clipping parameter in a related technology (a typical scenario), the foregoing implementation of this application is applicable to a plurality of scenarios. It is ensured that no clipping is missed, a PAPR is controllable, and a power amplifier is protected. In comparison with a manner in which each peak value needs to be extracted for clipping processing in a strict scenario, this manner of pre-configuring a clipping parameter based on a statistical feature and preprocessing the input signal in this application is simpler. This resolves a technical problem that a static clipping algorithm is excessively complex or an application scenario is limited in the related technology.

In a possible implementation, the apparatus further includes a third clipping module, configured to perform third clipping processing on the input signal based on a clipping parameter corresponding to the carrier parameter of the input signal, where the clipping parameter is configured for different carriers based on a statistical feature of peak distribution of the input signal.

In a possible implementation, the carrier parameter is an inter-carrier power ratio, and the clipping parameter is a weighting coefficient of clipping noise.

Based on the PAPR suppression apparatus in the foregoing implementation of this application, adaptive weighted allocation on the clipping noise is implemented by the communication device in a manner of configuring different clipping parameters for different carrier configurations based on the statistical feature of the peak distribution of the input signal. In comparison with the simple configuration of the clipping parameter in the related technology (the typical scenario), the foregoing implementation of this application is applicable to a plurality of scenarios. It is ensured that no clipping is missed, the PAPR is controllable, and the power amplifier is protected. In comparison with the manner in which each peak value needs to be extracted for clipping processing in the strict scenario, this manner of pre-configuring the clipping parameter based on the statistical feature in this application is simpler.

In a possible implementation, the input condition is a static first inter-carrier statistical feature. The second clipping module is further configured to: when the carrier parameter of the input signal does not satisfy the first inter-carrier statistical feature, perform second clipping processing on the input signal based on the carrier parameter of the input signal and the first inter-carrier statistical feature, to obtain the to-be-clipped signal. The first clipping module is configured to perform first clipping processing on the to-be-clipped signal based on a clipping parameter corresponding to the first inter-carrier statistical feature, to obtain the first clipped signal.

In a possible implementation, the apparatus further includes a first configuration module, configured to configure, based on the first inter-carrier statistical feature, the clipping parameter corresponding to the first inter-carrier statistical feature.

Based on the PAPR suppression apparatus in the foregoing implementation of this application, according to a process in which clipping processing is adaptively enabled based on a relationship between the input signal and the first inter-carrier statistical feature and clipping processing is performed on the input signal, PAPR control of a signal in any scenario is applicable, and an implementation is simple.

In a possible implementation, the input condition is a dynamic second carrier statistical feature. The apparatus further includes a second configuration module, configured to periodically obtain a new second carrier statistical feature, and configure, based on the new second carrier statistical feature, a clipping parameter corresponding to the new second carrier statistical feature.

In a possible implementation, the second clipping module is further configured to: when the carrier parameter of the input signal does not satisfy the second inter-carrier statistical feature, perform second clipping processing on the input signal based on the carrier parameter of the input signal and the second inter-carrier statistical feature, to obtain the to-be-clipped signal. The first clipping module is further configured to perform first clipping processing on the to-be-clipped signal based on a clipping parameter corresponding to the second inter-carrier statistical feature, to obtain the first clipped signal.

Based on the PAPR suppression apparatus in the foregoing implementation of this application, according to a process in which second clipping processing is adaptively enabled based on a relationship between the input signal and the second inter-carrier statistical feature and second clipping processing is performed on the input signal, statistics of an inter-carrier feature of the input signal is periodically collected, and the second inter-carrier statistical feature and the corresponding clipping parameter that are locally configured are updated based on the inter-carrier feature obtained through statistics collection, so that adaptive first clipping processing can also be implemented. Based on collaboration between the two processes in which adaptive clipping processing can be performed, PAPR control of a signal in any scenario is applicable, and an implementation is simple.

In a possible implementation, the carrier parameter of the input signal, the first inter-carrier statistical feature, and the second carrier statistical feature each are an inter-carrier power ratio.

An embodiment of this application provides a PAPR suppression apparatus, including a processor and a memory for storing executable instructions of the processor. The processor is configured to implement the foregoing method when executing the instructions.

An embodiment of this application provides a non-volatile computer-readable storage medium, storing computer program instructions. When the computer program instructions are executed by a processor, the foregoing method is implemented.

An embodiment of this application provides a computer program product, including computer-readable code or a non-volatile computer-readable storage medium carrying computer-readable code. When the computer-readable code is run on a processor in an electronic device, the processor in the electronic device performs the foregoing method.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (which are a non-exhaustive list) of the computer-readable storage medium include a portable computer disk, a hard disk, a random access memory (RAM), a read-only memory (ROM), an erasable programmable read-only memory (EPROM), a static random access memory (SRAM), a portable compact disc read-only memory (CD-ROM), a digital versatile disc (DVD), a memory stick, a floppy disk, a mechanical encoded device such as a punched card or a groove protrusion structure storing instructions, and any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this application may be assembly instructions, instruction set architecture (ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (LAN) or a wide area network (WAN), or may be connected to an external computer (for example, connected by using an Internet service provider over the Internet). In some embodiments, an electronic circuit, for example, a programmable logic circuit, a field programmable gate array (FPGA), or a programmable logic array (PLA), is customized by using status information of computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a dedicated computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the appended drawings illustrate system architectures, functions, and operations of possible implementations of apparatuses, systems, methods, and computer program products according to a plurality of embodiments of this application. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It is also to be noted that each block in the block diagrams and/or the flowcharts and a combination of blocks in the block diagrams and/or the flowcharts may be implemented by hardware (for example, a circuit or an ASIC (Application-Specific Integrated Circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, the disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

The foregoing descriptions are merely examples, are not exhaustive, and are not limited to the disclosed embodiments. Many modifications and changes are apparent to a person of ordinary skill in the art without departing from the scope and spirit of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. An apparatus, comprising:
a first clipping module; and
a second clipping module, the second clipping module being configured to output, to the first clipping module, a to-be-clipped signal that satisfies an input condition of the first clipping module, wherein the input condition comprises a peak distribution feature of an input signal; wherein:
the first clipping module is configured to perform first clipping processing on the to-be-clipped signal, to generate a first clipped signal; and
the apparatus is configured to provide a bypass mode, wherein:
the second clipping module is configured to receive an input signal and output the input signal to the first clipping module; and
the first clipping module is configured to perform third clipping processing on the input signal received from the second clipping module, the processing being based on a clipping parameter corresponding to a carrier parameter of the input signal, wherein the clipping parameter is configured for different carriers based on a statistical feature of peak distribution of the input signal.

2. The apparatus according to claim 1, wherein the second clipping module is configured to obtain an input signal, and when a carrier parameter of the input signal does not satisfy the input condition of the first clipping module, the second clipping module performs second clipping processing on the input signal based on the carrier parameter of the input signal and the input condition to obtain the to-be-clipped signal.

3. The apparatus according to claim 1, wherein the second clipping module is configured to obtain the input signal, and when the carrier parameter of the input signal satisfies the input condition of the first clipping module, output to the first clipping module the input signal as the to-be-clipped signal.

4. The apparatus according to claim 1, wherein the carrier parameter is an inter-carrier power ratio, and the clipping parameter is a weighting coefficient of clipping noise.

5. The apparatus according to claim 2, wherein the input condition of the first clipping module is a static first inter-carrier statistical feature;
the second clipping module is configured to: when the carrier parameter of the input signal does not satisfy the first inter-carrier statistical feature, perform second clipping processing on the input signal based on the carrier parameter of the input signal and the first inter-carrier statistical feature, to obtain the to-be-clipped signal; and
the first clipping module is configured to perform first clipping processing on the to-be-clipped signal based on a clipping parameter corresponding to the first inter-carrier statistical feature, to obtain the first clipped signal.

6. The apparatus according to claim 2, wherein:
the input condition of the first clipping module is a dynamic second inter-carrier statistical feature, and the first clipping module is configured to periodically update the second inter-carrier statistical feature and a clipping parameter corresponding to the second inter-carrier statistical feature;

36 the second clipping module is configured to, when the carrier parameter of the input signal does not satisfy the second inter-carrier statistical feature, perform second clipping processing on the input signal based on the carrier parameter of the input signal and the second inter-carrier statistical feature, to obtain the to-be-clipped signal; and
the first clipping module is configured to perform first clipping processing on the to-be-clipped signal based on the clipping parameter corresponding to the second inter-carrier statistical feature, to obtain the first clipped signal.

7. The apparatus according to claim 5, wherein the carrier parameter of the input signal, the first inter-carrier statistical feature, and the second inter-carrier statistical each feature an inter-carrier power ratio.

8. A method, comprising:
performing second clipping processing on an input signal whose carrier parameter does not satisfy an input condition to obtain a to-be-clipped signal, and performing first clipping processing on the to-be-clipped signal to obtain a first clipped signal, wherein:
the input condition comprises a peak distribution feature of an input signal and a carrier parameter of the to-be-clipped signal satisfies the input condition, the method further comprising:
performing third clipping processing on the input signal based on a clipping parameter corresponding to the carrier parameter of the input signal, the clipping parameter being configured for different carriers based on a statistical feature of peak distribution of the input signal.

9. The method according to claim 8, wherein performing second clipping processing on an input signal whose carrier parameter does not satisfy an input condition to obtain a to-be-clipped signal comprises:
performing second clipping processing on the input signal based on the carrier parameter of the input signal and the input condition when the carrier parameter of the input signal does not satisfy the input condition to obtain the to-be-clipped signal.

10. The method according to claim 8, further comprising:
performing first clipping processing on an input signal whose carrier parameter satisfies the input condition to obtain the first clipped signal.

11. The method according to claim 8, wherein the carrier parameter is an inter-carrier power ratio and the clipping parameter is a weighting coefficient of clipping noise.

12. The method according to claim 8, wherein the input condition is a static first inter-carrier statistical feature, and the performing second clipping processing on the input signal to obtain the to-be-clipped signal comprises:
performing second clipping processing on the input signal based on the carrier parameter of the input signal and the first inter-carrier statistical feature when the carrier parameter of the input signal does not satisfy the first inter-carrier statistical feature, to obtain the to-be-clipped signal; and
performing first clipping processing on the to-be-clipped signal to obtain a first clipped signal comprises:
performing first clipping processing on the to-be-clipped signal based on a clipping parameter corresponding to the first inter-carrier statistical feature to obtain the first clipped signal.

13. An apparatus, comprising:

at least one processor; and a memory coupled to the at least one processor and storing instructions for execution by the at least one processor wherein, when executed, the instructions cause the apparatus to perform operations comprising:

performing second clipping processing on an input signal whose carrier parameter does not satisfy an input condition to obtain a to-be-clipped signal;

performing first clipping processing on the to-be-clipped signal to obtain a first clipped signal, the input condition comprising a peak distribution feature of an input signal, and a carrier parameter of the to-be-clipped signal satisfies the input condition; and performing third clipping processing on the input signal based on a clipping parameter corresponding to the carrier parameter of the input signal, wherein the clipping parameter is configured for different carriers based on a statistical feature of peak distribution of the input signal.

14. The apparatus according to claim 13, wherein performing second clipping processing on an input signal comprises:

performing second clipping processing on the input signal based on the carrier parameter of the input signal and the input condition when the carrier parameter of the input signal does not satisfy the input condition to obtain the to-be-clipped signal.

15. The apparatus according to claim 13, wherein, when executed, the instructions cause the apparatus to perform operations comprising:

performing first clipping processing on an input signal whose carrier parameter satisfies the input condition to obtain the first clipped signal.

16. The apparatus according to claim 13, wherein the carrier parameter is an inter-carrier power ratio and the clipping parameter is a weighting coefficient of clipping noise.

17. The apparatus according to claim 13, wherein the input condition is a static first inter-carrier statistical feature, and performing second clipping processing on the input signal comprises:

performing second clipping processing on the input signal based on the carrier parameter of the input signal and the first inter-carrier statistical feature when the carrier parameter of the input signal does not satisfy the first inter-carrier statistical feature to obtain the to-be-clipped signal; and the performing first clipping processing on the to-be-clipped signal to obtain a first clipped signal comprises:

performing first clipping processing on the to-be-clipped signal based on a clipping parameter corresponding to the first inter-carrier statistical feature to obtain the first clipped signal.

* * * * *